(12) United States Patent
Bhaskaran et al.

(10) Patent No.: US 11,630,447 B1
(45) Date of Patent: Apr. 18, 2023

(54) AUTOMATED GUIDED VEHICLE FOR TRANSPORTING OBJECTS

(71) Applicant: Staples, Inc., Framingham, MA (US)

(72) Inventors: Michael Bhaskaran, Sherborn, MA (US); Weston Harris, Allston, MA (US); Maimuna Rangwala, North Grafton, MA (US)

(73) Assignee: Staples, Inc., Framingham, MA (US)

( * ) Notice: Subject to any disclaimer, the term of this patent is extended or adjusted under 35 U.S.C. 154(b) by 737 days.

(21) Appl. No.: 16/538,237

(22) Filed: Aug. 12, 2019

Related U.S. Application Data

(60) Provisional application No. 62/717,646, filed on Aug. 10, 2018.

(51) Int. Cl.
| | | |
|---|---|---|
| *B65G 1/137* | (2006.01) | |
| *G05B 19/418* | (2006.01) | |
| *G05D 1/02* | (2020.01) | |
| *G05D 1/00* | (2006.01) | |

(52) U.S. Cl.
CPC ..... *G05B 19/41895* (2013.01); *B65G 1/1373* (2013.01); *G05D 1/0088* (2013.01); *G05D 1/0272* (2013.01); *G05D 2201/0216* (2013.01)

(58) Field of Classification Search
CPC ............ G05B 19/41895; B65G 1/1373; G05D 1/0088; G05D 1/0272; G05D 2201/0216
See application file for complete search history.

(56) References Cited

U.S. PATENT DOCUMENTS

| | | | |
|---|---|---|---|
| 2,647,650 A * | 8/1953 | Sherriff | B66F 9/184 |
| | | | 294/902 |
| 3,450,276 A | 6/1969 | Ferrari | |
| 3,474,877 A | 10/1969 | Wesener | |
| 3,628,624 A | 12/1971 | Wesener | |
| 3,970,840 A | 7/1976 | De Bruine | |

(Continued)

FOREIGN PATENT DOCUMENTS

| | | |
|---|---|---|
| CA | 1196712 A | 11/1985 |
| CA | 1210367 A | 8/1986 |

(Continued)

OTHER PUBLICATIONS

US 7,460,017 B2, 12/2008, Roeder et al. (withdrawn)
(Continued)

*Primary Examiner* — Stephen Holwerda
(74) *Attorney, Agent, or Firm* — VLP Law Group LLP; Michel Bohn

(57) ABSTRACT

An automated guided vehicle (AGV) is described. In an example implementation, the AGV may include an AGV body; one or more elevator mechanisms coupled to the AGV body; a support surface coupled to the AGV body and vertically movable along the AGV body by the one or more elevator mechanisms, the support surface supporting an object from underneath the object when the object is placed on the support surface; one or more arms coupled to the AGV body and vertically movable along the AGV body by the one or more elevator mechanisms, the one or more arms articulating to move the object from a first position of the object and place the object on the support surface; and an AGV controller configured to control one or more operations of the AGV.

20 Claims, 17 Drawing Sheets

(56) References Cited

U.S. PATENT DOCUMENTS

| | | |
|---|---|---|
| 4,010,409 A | 3/1977 | Waites |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstrom |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstrom |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett, Jr. et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans, Jr. et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans, Jr. et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan et al. |
| 5,213,176 A | 5/1993 | Oroku et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,586,620 A * | 12/1996 | Dammeyer ............ B66F 9/122 414/641 |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson, Jr. et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |
| 7,616,127 B2 | 11/2009 | Sorenson, Jr. et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |

(56) References Cited

U.S. PATENT DOCUMENTS

| | | |
|---|---|---|
| 7,689,001 B2 | 3/2010 | Kim et al. |
| 7,693,757 B2 | 4/2010 | Zimmerman |
| 7,765,027 B2 | 7/2010 | Hong et al. |
| 7,826,919 B2 | 11/2010 | DAndrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | DAndrea et al. |
| 7,890,228 B2 | 2/2011 | Redmann, Jr. et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | DAndrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | DAndrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | DAndrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | DAndrea et al. |
| 8,269,643 B2 | 9/2012 | Chou |
| 8,271,132 B2 | 9/2012 | Nielsen et al. |
| 8,280,546 B2 | 10/2012 | DAndrea et al. |
| 8,280,547 B2 | 10/2012 | DAndrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | DAndrea et al. |
| 8,417,444 B2 | 4/2013 | Smid et al. |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | DAndrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | DAndrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B2 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |

(56) References Cited

U.S. PATENT DOCUMENTS

| | | |
|---|---|---|
| 9,213,934 B1 | 12/2015 | Versteeg et al. |
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | OBrien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | OBrien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | DAndrea et al. |
| 9,440,790 B2 | 9/2016 | Mountz et al. |
| 9,448,560 B2 | 9/2016 | DAndrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 9,823,662 B2 | 11/2017 | Mecklinger et al. |
| 10,328,836 B2 | 6/2019 | Purwin et al. |
| 10,589,940 B2 | 3/2020 | Yang et al. |
| 10,627,829 B2 | 4/2020 | Lin |
| 10,628,790 B1 | 4/2020 | Aggarwal et al. |
| 10,949,910 B2 | 3/2021 | Carpenter et al. |
| 2004/0073359 A1* | 4/2004 | Ichijo ............... G05D 1/0246 701/50 |
| 2006/0245893 A1 | 11/2006 | Schottke |
| 2010/0300841 A1 | 12/2010 | OBrien |
| 2012/0321423 A1 | 12/2012 | MacKnight et al. |
| 2013/0058743 A1 | 3/2013 | Rebstock |
| 2013/0302132 A1 | 11/2013 | DAndrea |
| 2014/0124462 A1 | 5/2014 | Yamashita |
| 2014/0240117 A1* | 8/2014 | McKernan ............ B66F 9/184 340/440 |
| 2014/0247116 A1 | 9/2014 | Davidson |
| 2015/0073589 A1 | 3/2015 | Khodl et al. |
| 2015/0081089 A1* | 3/2015 | Kapust ................ B65G 1/0435 700/218 |
| 2015/0117995 A1 | 4/2015 | DAndrea |
| 2015/0125252 A1 | 5/2015 | Berzen Ratzel |
| 2015/0307278 A1 | 10/2015 | Wickham et al. |
| 2016/0059875 A1* | 3/2016 | Segman ............... B62B 5/0079 701/24 |
| 2016/0090283 A1 | 3/2016 | Svensson et al. |
| 2016/0176637 A1 | 6/2016 | Ackerman et al. |
| 2016/0203543 A1 | 7/2016 | Snow |
| 2016/0232477 A1 | 8/2016 | Cortes et al. |
| 2016/0347545 A1 | 12/2016 | Lindbo et al. |
| 2017/0043953 A1 | 2/2017 | Battles et al. |
| 2017/0174431 A1 | 6/2017 | Borders et al. |
| 2017/0182924 A1 | 6/2017 | Lendo et al. |
| 2017/0229903 A1 | 8/2017 | Jones et al. |
| 2018/0057034 A1* | 3/2018 | Deshpande ............. B62B 5/002 |
| 2018/0141752 A1 | 5/2018 | Nakanishi et al. |
| 2018/0162433 A1 | 6/2018 | Jones et al. |
| 2018/0208398 A1 | 7/2018 | Haveman et al. |
| 2019/0016573 A1 | 1/2019 | DAndrea |
| 2019/0302775 A1 | 10/2019 | Palan et al. |
| 2020/0103916 A1 | 4/2020 | Tu et al. |

FOREIGN PATENT DOCUMENTS

| | | | |
|---|---|---|---|
| CA | 1228142 A | 10/1987 | |
| CA | 1238103 A | 6/1988 | |
| CA | 1264490 A | 1/1990 | |
| CA | 1267866 A | 4/1990 | |
| CA | 1269740 A | 5/1990 | |
| CA | 1271544 A | 7/1990 | |
| CA | 1275721 C | 10/1990 | |
| CA | 1276264 C | 11/1990 | |
| CA | 2029773 A1 | 5/1991 | |
| CA | 1291725 C | 11/1991 | |
| CA | 2036104 A1 | 11/1991 | |
| CA | 2042133 A1 | 1/1992 | |
| CA | 2049578 A1 | 2/1992 | |
| CA | 2296837 A1 | 2/1992 | |
| CA | 2094833 A1 | 4/1992 | |
| CA | 1304043 C | 6/1992 | |
| CA | 2095442 A1 | 6/1992 | |
| CA | 1304820 C | 7/1992 | |
| CA | 1323084 C | 10/1993 | |
| CA | 2189853 A1 | 11/1995 | |
| CA | 2244668 A1 | 3/1999 | |
| CA | 2469652 A1 | 6/2003 | |
| CA | 2514523 A1 | 8/2004 | |
| CA | 2565553 A1 | 11/2005 | |
| CA | 2577346 A1 | 4/2006 | |
| CA | 2613180 A1 | 1/2007 | |
| CA | 2921584 A1 | 1/2007 | |
| CA | 2625885 A1 | 4/2007 | |
| CA | 2625895 A1 | 4/2007 | |
| CA | 2837477 A1 | 4/2007 | |
| CA | 2864027 A1 | 4/2007 | |
| CA | 2636233 A1 | 7/2007 | |
| CA | 2640769 A1 | 8/2007 | |
| CA | 2652114 A1 | 12/2007 | |
| CA | 2654258 A1 | 12/2007 | |
| CA | 2654260 A1 | 12/2007 | |
| CA | 2654263 A1 | 12/2007 | |
| CA | 2654295 A1 | 12/2007 | |
| CA | 2654336 A1 | 12/2007 | |
| CA | 2654471 A1 | 12/2007 | |
| CA | 2748398 A1 | 12/2007 | |
| CA | 2748407 A1 | 12/2007 | |
| CA | 2750043 A1 | 12/2007 | |
| CA | 2781624 A1 | 12/2007 | |
| CA | 2781857 A1 | 12/2007 | |
| CA | 2838044 A1 | 12/2007 | |
| CA | 2866664 A1 | 12/2007 | |
| CA | 2921134 A1 | 12/2007 | |
| CA | 2663578 A1 | 4/2008 | |
| CA | 2860745 A1 | 4/2008 | |
| CA | 2671955 A1 | 7/2008 | |
| CA | 2673025 A1 | 7/2008 | |
| CA | 2674241 A1 | 7/2008 | |
| CA | 2691710 A1 | 12/2008 | |
| CA | 2721345 A1 | 10/2009 | |
| CA | 2760127 A1 | 11/2009 | |
| CA | 2760225 A1 | 11/2009 | |
| CA | 2743706 A1 | 6/2010 | |
| CA | 2754626 A1 | 9/2010 | |
| CA | 2765565 A1 | 1/2011 | |
| CA | 2932535 A1 | 1/2011 | |
| CA | 2932537 A1 | 1/2011 | |
| CA | 2770139 A1 | 2/2011 | |

(56) References Cited

FOREIGN PATENT DOCUMENTS

| | | |
|---|---|---|
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012154872 A2 | 11/2012 |
| WO | 2016015000 A2 | 1/2016 |
| WO | 2018/017102 A1 | 1/2018 |

OTHER PUBLICATIONS

US 9,050,932 B2, 06/2015, Bernstein et al. (withdrawn)
US 9,342,073 B2, 05/2016, Bernstein et al. (withdrawn)
Warehouse Robots at Work, IEEE Spectrum,. Jul. 21, 2008, YouTube https://www.youtube.com/watch?v=IWsMdN7HMuA.
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).
Da-Sol, Kim, "E-mart unveils autonomous shopping cart Eli for test run," http://www.koreaherald.com/view.php?ud=20180417000718, Apr. 17, 2018, 4 pgs.
Mannes, John, "Canvas' robot cart could change how factories work," https://techcrunch.com/2017/09/07/canvas-robot-cart-could-change-how-factories-work/, Posted Sep. 7, 2017, 5 pgs.
Vincent, James, "LG unveils new concept robots for carrying your drinks, suitcase, and shopping," https://www.theverge.com/circuitbreaker/2018/1/4/16848886/lg-concept-robots-carrying-drinks-luggage-shopping, The Verge, Jan. 4, 2018, 2 pgs.

\* cited by examiner

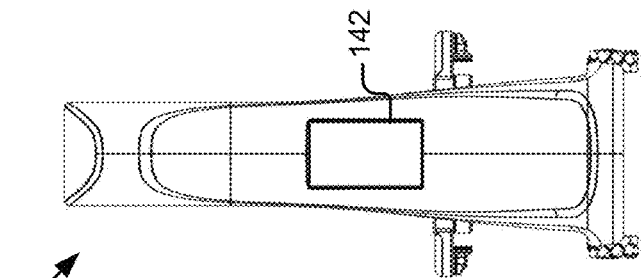
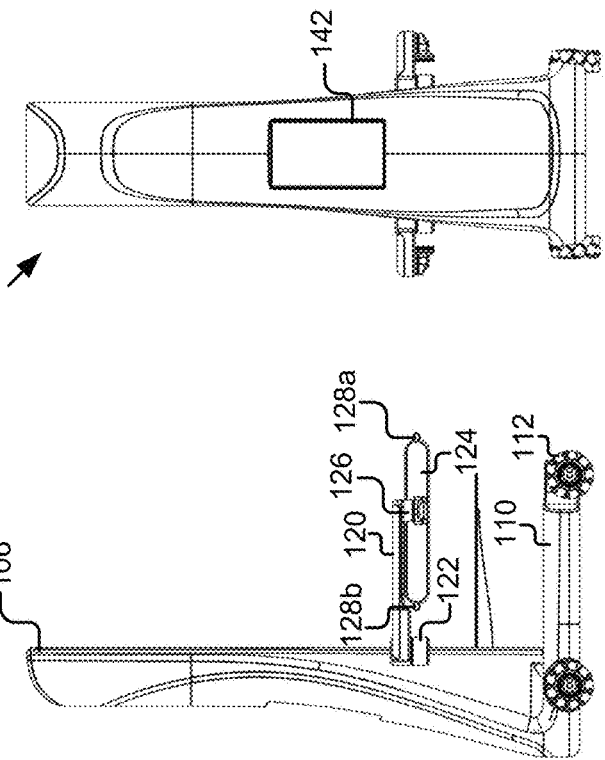
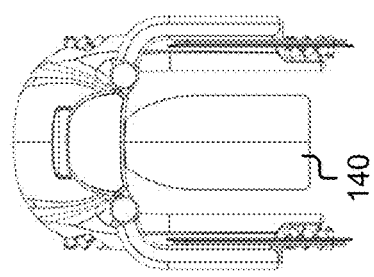
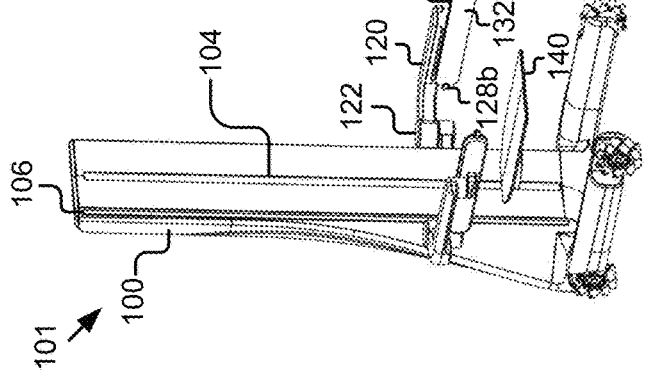

AUTOMATED GUIDED VEHICLE FOR TRANSPORTING OBJECTS

BACKGROUND

The present disclosure relates to automated guided vehicles (AGVs). In a more particular example, the present disclosure relates to automated guided vehicles that automatically transport objects between locations.

Storage and retail facilities often rely on human workers to transport objects such as containers between different locations, and in some situations, to put away items stored in these containers to their storage places. For example, a human worker may manually transport multiple containers from a shelving unit to a floor surface in front of storage aisles, pick up a container, and put away various items stored in the container to their storage places in the storage aisles. As the items in the container may be placed in different storage aisles, the human worker may need to manually carry the container or push a cart including the container while walking through multiple storage aisles to place the items in their corresponding storage places. This solution is generally inefficient and often quickly causes fatigue to the human workers due to the physical effort to unload the containers from the shelving unit, as well as to manually carry the container or push the cart while walking back and forth between multiple storage aisles to put away the items. In addition, the human worker may need to carry a container in hand up a ladder in order to reach high storage locations at which to place items from the container. It is usually inconvenient and potentially dangerous for the human worker to carry the container and perform these movements at the same time.

SUMMARY

An automated guided vehicle (AGV) can be configured to perform particular operations or actions by virtue of having software, firmware, hardware, or a combination thereof installed on the AGV that may cause the AGV to perform the operations or actions. According to one innovative aspect of the subject matter described in this disclosure, an AGV includes: an AGV body; one or more elevator mechanisms coupled to the AGV body; a support surface coupled to the AGV body and vertically movable along the AGV body by the one or more elevator mechanisms, the support surface supporting an object from underneath the object when the object is placed on the support surface; one or more arms coupled to the AGV body and vertically movable along the AGV body by the one or more elevator mechanisms, the one or more arms articulating to move the object from a first position of the object and place the object on the support surface; and an AGV controller configured to control one or more operations of the AGV.

In general, another innovative aspect of the subject matter described in this disclosure may be embodied in methods comprising: determining a first position of an object in a first area; aligning an automated guided vehicle (AGV) with the first position of the object, the AGV including a support surface and one or more arms coupled to an AGV body, the support surface and the one or more arms being vertically movable along the AGV body; vertically moving the support surface of the AGV along the AGV body to a first surface position relative to the first position of the object; vertically moving the one or more arms of the AGV along the AGV body to a first arm position relative to the first position of the object; retrieving the object from the first position of the object using the one or more arms, the one or more arms holding the object; and moving the object towards the support surface by the one or more arms holding the object to place the object on the support surface.

In general, another innovative aspect of the subject matter described in this disclosure may be embodied in an AGV including: an AGV body; one or more elevator mechanisms coupled to the AGV body; a support surface coupled to the AGV body and vertically movable along the AGV body by the one or more elevator mechanisms, the support surface supporting an object from underneath the object when the object is placed on the support surface; a plurality of arms coupled to the AGV body and vertically movable along the AGV body by the one or more elevator mechanisms, the plurality of arms articulating to move the object from a first position of the object and place the object on the support surface, an arm in the plurality of arms including a hand element comprising a paddle slideable along the hand element and a finger element mounted to an end of the paddle, the paddle adapted to hold the object between a plurality of paddles of the plurality of arms, the finger element adapted to pivot to rest against a second object surface of the object to grasp the object, a wrist element coupling the hand element to the arm, the wrist element adapted to horizontally pivot the hand element around the wrist element to adjust a distance between the plurality of paddles of the plurality of arms based on the object, and a shoulder element coupling the arm to the AGV body, the shoulder element adapted to horizontally pivot the arm around the shoulder element to adjust the distance between the plurality of paddles of the plurality of arms based on the object; one or more legs coupled to the AGV body, the one or more legs including one or more multi-directional wheels adapted to move the AGV; and an AGV controller configured to control one or more operations of the AGV.

These and other implementations of the AGV may each optionally include one or more of the following features: that the one or more arms includes a plurality of arms and an arm in the plurality of arms includes a hand element comprising a paddle slideable along the hand element, the paddle adapted to hold the object between a plurality of paddles of the plurality of arms, the paddle sliding along the hand element when the object is held between the plurality of paddles of the plurality of arms to move the object; that the hand element includes a finger element mounted to an end of the paddle, the finger element being pivotable to rest against a second object surface of the object to grasp the object; that the one or more arms includes a plurality of arms and an arm in the plurality of arms includes a shoulder element coupling the arm to the AGV body, the shoulder element adapted to horizontally pivot the arm around the shoulder element to adjust a distance between a plurality of paddles of the plurality of arms based on the object, and a wrist element coupling a hand element of the arm to the arm, the wrist element adapted to horizontally pivot the hand element around the wrist element to adjust the distance between the plurality of paddles of the plurality of arms based on the object; that the AGV transports the object to or from a shelving unit, and the AGV includes one or more legs coupled to the AGV body, the one or more legs satisfying a height threshold associated with a space underneath the shelving unit; a plurality of legs coupled to the AGV body and separated by a distance satisfying a distance threshold to accommodate the object between the plurality of legs; a user communication unit including a voice interface device, the voice interface device adapted to receive one or more of a voice command and a voice input from a user; that the AGV controller executes one or more instructions that cause the AGV to align the AGV with the first position of the object, vertically move the support surface along the AGV body to a first surface position relative to the first position of the object, vertically move the one or more arms along the AGV body to a first arm position relative to the first position of the object, retrieve the object from the first position of the object using the one or more arms, the one or more arms holding the object, and move the object towards the support surface by the one or more arms holding the object to place the object on the support surface.

These and other implementations of the method may each optionally include one or more of the following features: that determining an object size of the object, adjusting the one or more arms based on the object size of the object, and responsive to moving the support surface to the first surface position and the one or more arms to the first arm position and responsive to adjusting the one or more arms, retrieving the object from the first position of the object using the one or more arms; that an arm in the one or more arms includes a shoulder element coupling the arm to the AGV body, the arm being horizontally pivotable around the shoulder element, a hand element including a paddle slideable along the hand element and a finger element mounted to an end of the paddle, the finger element being pivotable to rest against an object surface of the object, and a wrist element coupling the hand element to the arm, the hand element being horizontally pivotable around the wrist element; that the one or more arms include a plurality of arms and that determining an object size of the object, and horizontally pivoting one or more of the arm and the hand element of the arm to adjust a distance between a plurality of paddles of the plurality of arms based on the object size of the object; that the one or more arms include a plurality of arms, and retrieving the object from the first position of the object and moving the object towards the support surface includes sliding the paddle forward to hold the object between a plurality of paddles of the plurality of arms, pivoting the finger element to rest the finger element against a second object surface of the object to grasp the object, and sliding the paddle backward along the hand element to move the object being held by the plurality of paddles of the plurality of arms towards the support surface and place the object on the support surface; determining the first surface position for the support surface based on the first position of the object, a distance between the first surface position of the support surface and a bottom surface of the object located at the first position satisfying a first distance threshold, and determining the first arm position for the one or more arms based on the first position of the object, a distance between the first arm position of the one or more arms and a top surface of the object located at the first position satisfying a second distance threshold; responsive to placing the object on the support surface of the AGV, transporting the object situated on the support surface to a second area, determining a second position for the object in the second area, aligning the AGV with the second position of the object, vertically moving the support surface of the AGV along the AGV body to a second surface position relative to the second position of the object, vertically moving the one or more arms of the AGV along the AGV body to a second arm position relative to the second position of the object, and moving the object situated on the support surface of the AGV by the one or more arms holding the object to place the object at the second position of the object; determining the second surface position for the support surface based on the second position of the object, a distance between the second surface position of the support surface and the second position of the object satisfying a first distance threshold, determining a moving direction and a moving distance for the support surface to move to the second surface position, and determining the second arm position for the one or more arms based on the moving direction and the moving distance of the support surface; that the one or more arms include a plurality of arms and moving the object to the second position of the object includes pivoting a finger element of an arm away from an object surface of the object against which the finger element rested, and sliding a paddle forward along a hand element of the arm to move the object being held by the plurality of arms from the support surface of the AGV to the second position of the object; monitoring a tracking device associated with a user, the tracking device indicating a current position of the user in an operating environment, placing a first object on the support surface of the AGV, and responsive to placing the first object on the support surface of the AGV, maintaining a following distance between the AGV and the tracking device to automatically follow the user in the operating environment; responsive to determining that a height distance of the current position of the user to a floor surface satisfies a height threshold, determining a surface position for the support surface based on the current position of the user, and vertically moving the support surface of the AGV on which the object is situated along the AGV body to the surface position.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 1A-1E respectively illustrate a perspective diagram, a front-view diagram, a side-view diagram, a back-view diagram, and a top-view diagram of an example container-transport AGV.

DESCRIPTION

Figures 1F, 1G, 1H:
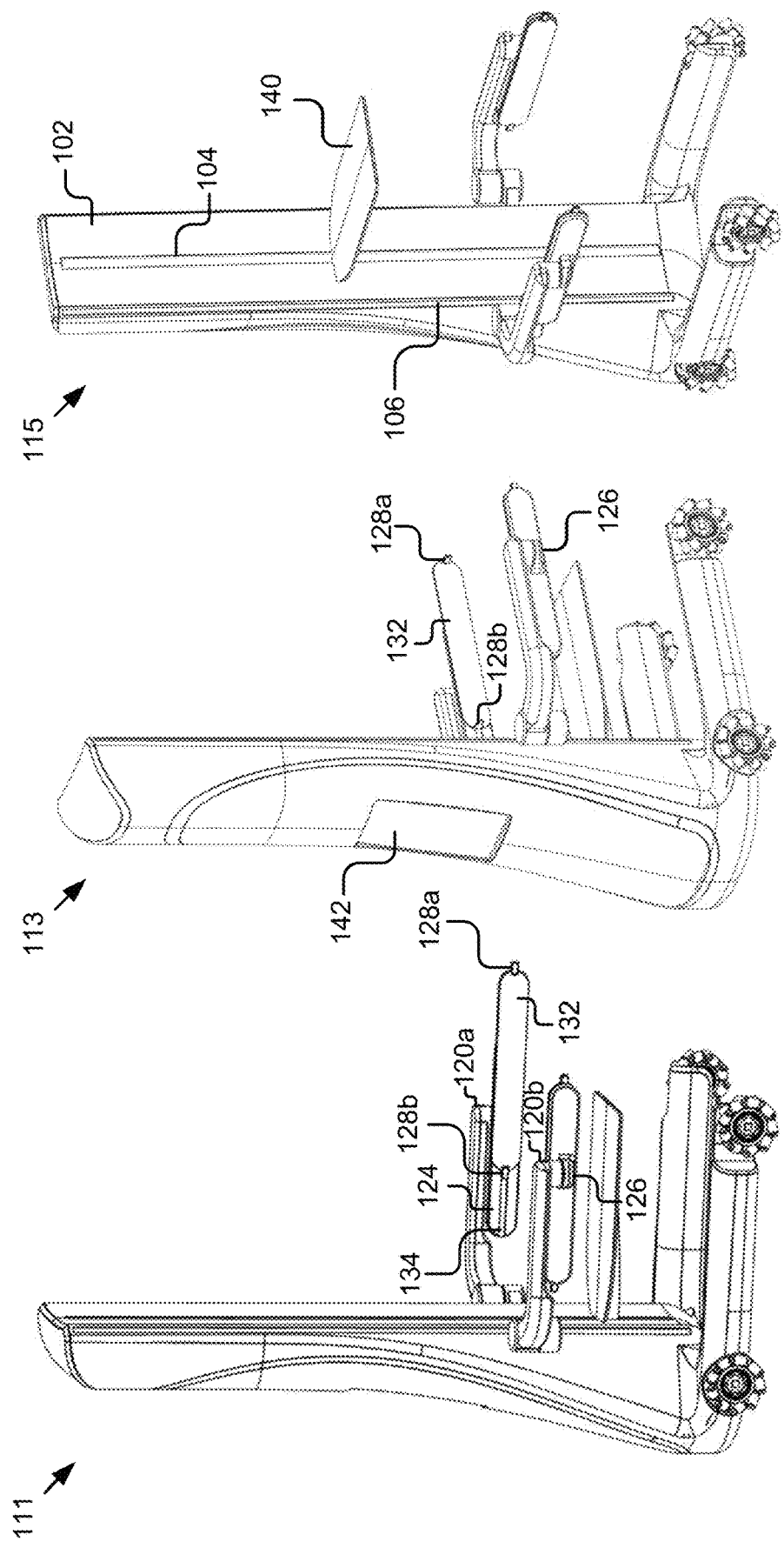
FIGS. 1F and 1G are perspective diagrams of an example container-transport AGV illustrating components of a grabbing arm.
FIG. 1H is a perspective diagram of an example container-transport AGV illustrating example operations of a support surface.

The technology presented in this disclosure improves upon the existing approaches and is advantageous in a number of respects. For example, the automated guided vehicle (AGV) described herein can replace or assist the human workers in the process of transporting objects such as containers between different locations and also facilitate the human workers in the process of putting away the items stored in the containers. As discussed elsewhere herein, the AGV may retrieve an object to be transported using one or more grabbing arms and place the object onto a support surface. Thus, the object may be supported from underneath the object by the support surface during its transportation. These implementations may be advantageous, because they may avoid dropping the object even if one or more components of the one or more grabbing arms holding the object encounter an unexpected failure. Similarly, these implementations may also decrease the wear and motor power consumed by the components that form the grabbing arm, because, in some implementations, the one or more grabbing arms move the object to or from the support surface on which the object is situated, which may assist the grabbing arms and/or support the object during movement of the grabbing arms and/or AGV.

As a further example, in some embodiments, the AGV may include a plurality of grabbing arms and the plurality of grabbing arms may be capable of moving along an AGV body of the AGV and adjusting a distance between the plurality of grabbing arms based on the object size of the object. As a result, in some embodiments, the AGV may be able to carry various objects having different shape and size and transport them to and from various positions that are at different heights from the floor surface. Furthermore, the plurality of grabbing arms of the AGV may include a paddle slideable forward and backward along a hand element. The paddle may slide forward against an object surface of the object to hold the object between a plurality of paddles of the plurality of grabbing arms. Thus, for the objects that are placed on a shelving unit, the plurality of grabbing arms may be extended forward into the shelving unit with the paddles, and therefore an object located proximate to a back side of the shelving unit can be reached and retrieved by the plurality of grabbing arms of the AGV. As discussed elsewhere herein, the AGV may also include one or more legs that can fit into a space underneath the shelving unit, and thus the AGV can be positioned in close proximity to the shelving unit to facilitate its operation with the objects placed thereon.

In addition, as discussed elsewhere herein, the AGV may retrieve an object, place the object on its support surface, and automatically follow a user in the operating environment with the object situated on its support surface. These implementation may be advantageous, because they may eliminate the need for the user to manually carry the object or push the cart containing the object as the user proceeds in the operating environment. In some situations, the user may move from a position at which the user stands on a floor surface to a higher position or a lower position in order to reach the target position of the object or the target position of the item stored in the object (e.g., a user may climb a ladder to reach a high shelf). In these situations, the AGV may automatically raise or lower its support surface on which the object is situated to a position proximate to the current position of the user, thereby facilitating the user in reaching the object, for instance, this embodiment may be advantageous because it may eliminate or limit the need for the user to manually carry the object while moving to the higher position or to the lower position, thereby improving the safety of the user when performing these movements. Furthermore, the some embodiments of the AGV described herein may also capable of displaying information to the user via a visual interface device and receiving voice commands and/or voice inputs from the user via a voice interface device. As a result, the communication between the user and the AGV, as well as communication between the user and the server via the AGV, can be facilitated.

The technology described herein includes an example AGV that automatically transports objects between different locations in an operating environment. In some embodiments, the AGV may be a robotic vehicle operating in the storage facility. For example, the AGV may transport containers storing various inventory items between different locations in the storage facility. As the AGV can transport a container, the AGV may be referred to herein as the container-transport AGV, although it should be understood that the AGV may transport other types of objects (e.g., inventory items, facility equipment, etc.). In some embodiments, a container may be an object that is capable of storing items. In some embodiments, to place the items into the container, the management system of the storage facility (e.g., the management system implemented on a server, as described below) may reference the planogram that specifies the items stored in each storage aisle of the storage facility, and manage the placement of the items into the containers such that the items belonging to the same storage aisle may be placed in the same container. The storage aisle where the items in the container are stored may be referred to as the storage aisle associated with the container. Non-limiting examples of the container include, but are not limited to, a storage box, tote, pallet, mini pallet, etc.

In some embodiments, the containers may be stackable. For example, one container may be placed on a top surface of another container to form a container stack including multiple containers. In some situations, the containers may be placed on a shelving unit. The shelving unit may include one or more shelves on which the containers are situated. In some embodiments, when the shelving unit is positioned on a floor surface, the shelving unit may have a space underneath the shelving unit that is in between the bottom surface of the shelving unit and the floor surface (e.g., the ground floor, the vehicle floor of the delivery vehicle, etc.).

An example container-transport AGV 100 is depicted in FIGS. 1A-1E. FIG. 1A illustrates a perspective diagram 101, FIG. 1B illustrates a front-view diagram 103, FIG. 1C illustrates a side-view diagram 105, FIG. 1D illustrates a back-view diagram 107, and FIG. 1E illustrates a top-view diagram 109 of the container-transport AGV 100. In FIGS. 1A-1E and the remaining figures, a letter after a reference number, e.g., "120a," represents a reference to the element having that particular reference number. A reference number in the text without a following letter, e.g., "120," represents a general reference to instances of the element bearing that reference number. As illustrated in FIGS. 1A-1E, the container-transport AGV 100 may include an AGV body 102, a support surface 140 coupled to the AGV body 102, and one or more grabbing arms 120 coupled to the AGV body 102.

The container-transport AGV 100 may also include one or more legs 110 extended from the AGV body 102 and one or more multi-directional wheels 112 coupled to the one or more legs 110. In some embodiments, the container-transport AGV 100 may include a user communication unit 142, a guidance unit (not shown), and/or an AGV controller 160 (not shown). Other components of the container-transport AGV 100 are also possible and contemplated.

As illustrated in FIGS. 1A-1E, the AGV body 102 of the container-transport AGV 100 may be extended vertically. As depicted, the AGV body 102 may be coupled to an elevator mechanism 104 and one or more elevator mechanisms 106 that are extended along at least a portion of the AGV body 102. In some embodiments, the elevator mechanism 104 may be actuated to vertically move the support surface 140 along the elevator mechanism 104, and the one or more elevator mechanisms 106 may be actuated to vertically move the one or more grabbing arms 120 along the corresponding elevator mechanism 106. As a result, the support surface 140 and the one or more grabbing arms 120 may be movable upward and downward along the AGV body 102 to reach various positions having different heights to the floor surface. In some embodiments, the elevator mechanism 104 and the elevator mechanisms 106 may collaboratively operate to raise or lower the support surface 140 and the one or more grabbing arms 120 together, and thus the support surface 140 and the one or more grabbing arms 120 may vertically move along the AGV body 102 in the same moving direction (e.g., upward along the AGV body 102) with the same moving distance (e.g., 32 cm). Alternatively, the elevator mechanism 104 and the elevator mechanisms 106 may raise or lower the support surface 140 and the one or more grabbing arms 120 independently. For example, the elevator mechanisms 106 may raise the first grabbing arm 120a (e.g., upward along the AGV body 102 by 5 cm) and lower the second grabbing arm 120b (e.g., downward along the AGV body 102 by 3 cm) while the support surface 140 may remain at the same position.

As discussed elsewhere herein, the container-transport AGV 100 may include one or more grabbing arms 120 adapted to retrieve and release the object being transported by the container-transport AGV 100. As illustrated in FIGS. 1A-1E, the container-transport AGV 100 may include a plurality of grabbing arms 120 coupled to the AGV body 102 and vertically movable along the AGV body 102 by the elevator mechanisms 106. In some embodiments, the elevator mechanisms 106 may vertically move the plurality of grabbing arms 120 along the AGV body 102 towards a first position from which the object is retrieved or towards a second position to which the object is transported. As depicted, the grabbing arm 120 may include a shoulder element 122 coupling the grabbing arm 120 to the AGV body 102, a hand element 124 for handling the object, and a wrist element 126 coupling the hand element 124 to the grabbing arm 120.

In some embodiments, to couple the grabbing arm 120 to the AGV body 102, the shoulder element 122 may couple the grabbing arm 120 to the corresponding elevator mechanism 106, and thus the elevator mechanism 106 may vertically move the grabbing arm 120 upward and downward along the AGV body 102 via the shoulder element 122. In some embodiments, the shoulder element 122 may also be adapted to horizontally pivot the grabbing arm 120 around the shoulder element 122 to adjust the distance between the hand elements 124 of the plurality of grabbing arms 120 based on the object being transported (e.g., based on dimensions, weight, configuration, etc. of the object). In some embodiments, the shoulder element 122 may be motorized with one or more motors that can be actuated to horizontally pivot the grabbing arm 120. In some embodiments, the plurality of grabbing arms 120 may pivot relative to one another. For example, the plurality of grabbing arms 120 may horizontally pivot around the corresponding shoulder elements 122 with the same rotation angle (e.g., 30°) but in opposite directions (e.g., towards the left versus towards the right relative to the AGV body 102). Thus, the plurality of grabbing arms 120 may collaboratively operate to hold and move the object, thereby retrieving the object from the first position of the object or releasing the object to the second position of the object.

In some embodiments, the hand element 124 may include a paddle 132 that is slideable along the hand element 124. To illustrate the components and the operations of the hand element 124, FIG. 1F depicts a perspective diagram 111 of the container-transport AGV 100 in which the first grabbing arm 120a may have the paddle 132 sliding forward along the hand element 124, and the second grabbing arm 120b may have the paddle 132 remaining at its default position relative to the hand element 124. As depicted in FIG. 1F, the hand element 124 may include a channel 134 extended along at least a portion of the hand element 124, and the hand element 124 may be motorized with one or more motors that can be actuated to slide the paddle 132 forward and backward along the channel 134.

In some embodiments, as the paddle 132 slides forward along the channel 134, the paddle 132 may slide along an object surface of the object to be transported and rest against the object surface of the object. Thus, as the plurality of paddles 132 of the plurality of grabbing arms 120 slide forward against different object surfaces of the object, the object may be held between the plurality of paddles 132 of the plurality of grabbing arms 120. In some embodiments, as the object is held between the plurality of paddles 132 of the plurality of grabbing arms 120, the plurality of paddles 132 of the plurality of grabbing arms 120 may slide forward or backward along their corresponding channel 134 to move the object. These implementations of slideable paddle 132 may be advantageous, because they may allow the hand element 124 to be extended with the paddle 132 to reach the position of the object that the container-transport AGV 100 cannot approach due to the shape and size of the AGV body 102 (e.g., the object may be located at the back side of a shelving unit). While some embodiments of the container-transport AGV 100 are described as having a paddle 132, some embodiments may additionally or alternatively include a suction device (e.g., suction cup) that adheres to a surface of the object to retrieve and hold the object. Other implementations of the paddle 132 and/or the hand element 124 are also possible and contemplated.

In some embodiments, as depicted in FIG. 1F, the hand element 124 may include one or more finger elements 128 mounted to one or more ends of the paddle 132. The finger element 128 may be motorized with one or more motors that can be actuated to bend the finger element 128 inward and/or outward relative to the paddle 132 to which the finger element 128 may be mounted. FIG. 1G depicts a perspective diagram 113 of the container-transport AGV 100 in which the first grabbing arm 120a may have the paddle 132 sliding forward and the finger elements 128a and 128b are bent inward relative to the paddle 132, while the second grabbing arm 120b may have the paddle 132 and the finger elements 128 remaining at their default positions, as an illustrative example. As depicted in FIG. 1G, the finger elements 128a and 128*b* may be folded inward at a folding angle (e.g., 90°) relative to the paddle 132 of the first grabbing arm 120*a*.

In some embodiments, to grasp the object with the plurality of grabbing arms 120, the paddle 132 of the grabbing arm 120 may slide forward and rest against a first object surface of the object, and the finger element 128 of the grabbing arm 120 may bend at a folding angle and rest against a second object surface of the object. As the plurality of grabbing arms 120 perform these operations, the object may be securely gripped with the paddle 132 and the finger element 128 of the plurality of grabbing arms 120. In some embodiments, to release the object being held between the plurality of grabbing arms 120, the finger element 128 of the grabbing arm 120 may bend away from the second object surface of the object. As the finger element 128 no longer rests against the second object surface of the object, the object may not be gripped and the backward movement of the paddle 132 along the hand element 124 after the object is released from the paddles 132 can be facilitated. In some embodiments, the hand element 124 of the grabbing arm 120 may include multiple finger elements 128 bendable against multiple second object surfaces of the object. The finger element 128 may also be bendable at various folding angles to flexibly grasp various objects having different shapes and sizes. Other implementations of the finger element 128 are also possible and contemplated.

As depicted in FIGS. 1C, 1F, and 1G, the grabbing arm 120 may include the wrist element 126 coupling the hand element 124 to the grabbing arm 120. In some embodiments, the wrist element 126 may be motorized with one or more motors that can be actuated to horizontally pivot the hand element 124 using the wrist element 126. Thus, as the shoulder element 122 can horizontally pivot the grabbing arm 120 around the shoulder element 122 and the wrist element 126 can horizontally pivot the hand element 124 of the grabbing arm 120 around the wrist element 126, the distance between the plurality of paddles 132 of the plurality of grabbing arms 120 can be flexibly adjusted based on the object being transported by the container-transport AGV 100. For example, the container-transport AGV 100 may actuate one or more motors included in the shoulder element 122 and/or the wrist element 126 of the plurality of grabbing arms 120 to horizontally pivot the plurality of grabbing arms 120 at their shoulder element 122 and/or their wrist element 126, thereby adjusting the distance between the plurality of paddles 132 of the plurality of grabbing arms 120 to be equal to the size of the object being transported. As a result, the object can fit between the plurality of paddles 132 of the plurality of grabbing arms 120, and thus the plurality of grabbing arms 120 can hold the object between their paddles 132.

Figure 1J:
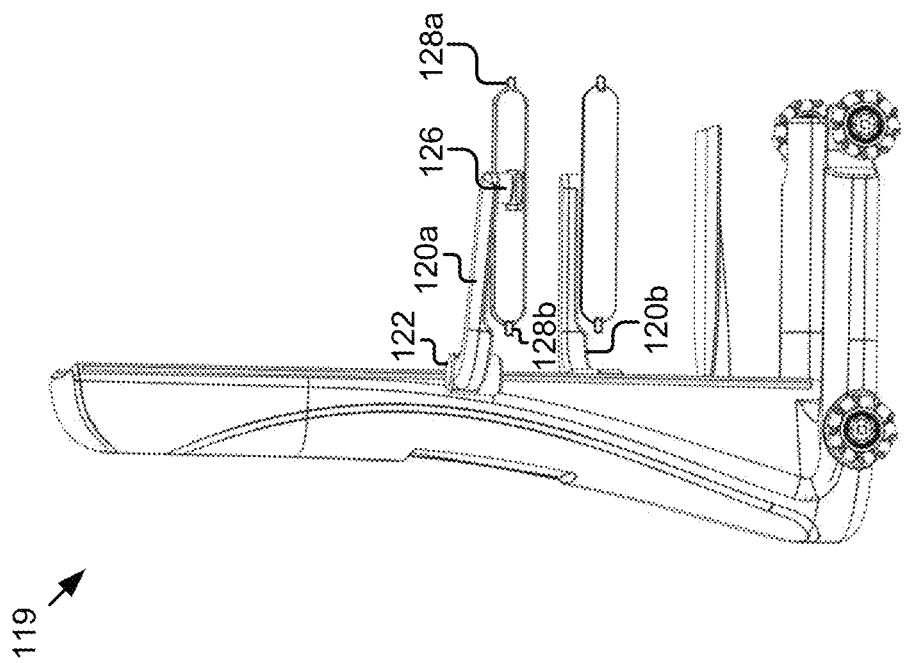
FIGS. 1I and 1J are perspective diagrams of an example container-transport AGV illustrating example operations of a grabbing arm.
Figure 1I:
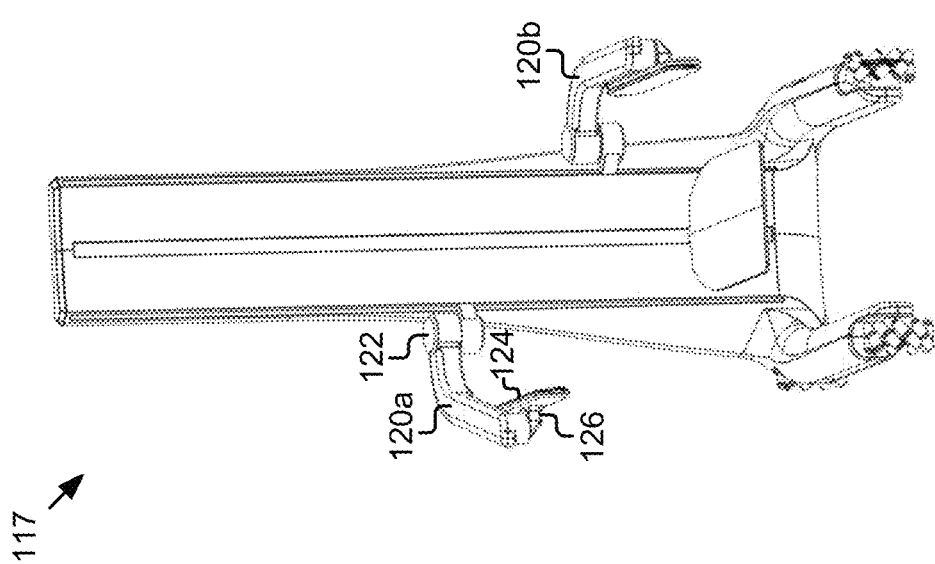

To illustrate the operations of the grabbing arm 120, FIG. 1I depicts a perspective diagram 117 from a first perspective and FIG. 1J depicts a perspective diagram 119 from a second perspective of the container-transport AGV 100 in which the first grabbing arm 120*a* is vertically moved along the AGV body 102 and horizontally pivoted, while the second grabbing arm 120*b* may remain at its default position. As depicted in FIGS. 1I and 1J, the first grabbing arm 120*a* may vertically move upward along the AGV body 102 and horizontally pivot outward relative to the AGV body 102 around the shoulder element 122. The hand element 124 of the first grabbing arm 120*a* may also horizontally pivot outward relative to the AGV body 102 around the wrist element 126. Therefore, the first grabbing arm 120*a* may be located at a higher position from the floor surface on which the container-transport AGV 100 stands as compared to the second grabbing arm 120*b*. As illustrated, the first grabbing arm 120*a* may also have a larger open angle relative to the AGV body 102 as compared to the second grabbing arm 120*b*. It should be noted that the bending directions, height, and other configurations described herein are provided by way of example, for example, a grabbing arm 120 may articulate one or more of the shoulder element 122, wrist element 126, and/or finger element 128 vertically or at some other angles.

As depicted in FIGS. 1F, 1G, 1I, and 1J, the operations of the grabbing arm 120 and/or its components (e.g., the hand element 124, the paddle 132, the finger element 128, etc.) are applied to one grabbing arm 120 of the plurality of grabbing arms 120 to illustrate the movements of the grabbing arm 120 and its components as compared to their default positions. It should be understood that the operations of the grabbing arm 120 and the components of the grabbing arm 120 may be applied to one grabbing arm 120 or multiple grabbing arms 120 of the plurality of grabbing arms 120. It should also be understood that the operations applied to multiple grabbing arms 120 may be the same or different from one another. For example, the first grabbing arm 120*a* and the second grabbing arm 120*b* may vertically move to the arm positions having the same height to the floor surface. The first grabbing arm 120*a* may pivot to the left while the second grabbing arm 120*b* may pivot to the right relative to the AGV body 102 with the same or different rotation angles. Other operations of the plurality of grabbing arms 120 and their components are also possible and contemplated.

As discussed elsewhere herein, the container-transport AGV 100 may include the support surface 140 coupled to the AGV body 102 and vertically movable upward and downward along the AGV body 102. As depicted in FIGS. 1A and 1C, the support surface 140 may be coupled to the elevator mechanism 104, and the elevator mechanism 104 may vertically move the support surface 140 along the AGV body 102 towards the first position from which the object is retrieved or towards the second position to which the object is transported. In some embodiments, the support surface 140 may be a flat surface on which the object may be situated, and thus the support surface 140 may support the object from underneath the object when the object is placed on the support surface 140.

To illustrate the operations of the support surface 140, FIG. 1H depicts a perspective diagram 115 of the container-transport AGV 100 in which the elevator mechanism 104 may vertically move the support surface 140 upward along the AGV body 102. As discussed elsewhere herein, the support surface 140 may vertically move along the AGV body 102 independently from the plurality of grabbing arms 120 as illustrated in FIG. 1H. Alternatively, the support surface 140 may vertically move along the AGV body 102 together with the plurality of grabbing arms 120. For example, the support surface 140 and the plurality of grabbing arms 120 may vertically move along the AGV body 102 in the same moving direction with the same moving distance, and therefore the relative position between the plurality of grabbing arms 120 and the support surface 140 remains unchanged. As a result, the plurality of grabbing arms 120 may continue to hold the object between the plurality of grabbing arms 120 while the object is vertically moved along the AGV body 102 by the support surface 140. These implementations may be advantageous because they allow the plurality of grabbing arms 120 to move the object when the object reaches the target height or move the object simultaneously while the support surface 140 is vertically moving the object.

As discussed elsewhere herein, the container-transport AGV 100 may include the one or more legs 110 coupled to the AGV body 102. As depicted in FIGS. 1A-1E, the container-transport AGV 100 may include a plurality of legs 110 extended from the AGV body 102 and separated by a leg distance 144. In some embodiments, the leg distance 144 may satisfy a leg distance threshold (e.g., more than 45 cm) to accommodate one or more objects between the plurality of legs 110. For example, the container-transport AGV 100 may accommodate a stack of containers between the plurality of legs 110 (e.g., provide space to place the stack between a portion of the legs 110), thereby facilitating the operations of the container-transport AGV 100 with the stack of containers (e.g., retrieving a container from the stack, placing an additional container on the stack, etc.). In some situations, the container-transport AGV 100 may transport the object to or from a shelving unit, and the shelving unit may have a space underneath the shelving unit. In some embodiments, the one or more legs 110 of the container-transport AGV 100 may satisfy a height threshold associated with the space underneath the shelving unit (e.g., less than 10 cm). For instance, the container-transport AGV 100 may be configured to insert a portion of its legs 110 into the space underneath the shelving unit, and thus the container-transport AGV 100 may be positioned in close proximity to the shelving unit to facilitate its operation with the objects placed thereon.

As depicted in FIGS. 1A-1E, the container-transport AGV 100 may include a one or more multi-directional wheels 112 coupled to the one or more legs 110. The multi-directional wheels 112 may be driven by one or more power motors and/or one or more driving actuators to move the container-transport AGV 100. In some embodiments, the multi-directional wheels 112 may be capable of rotating around two or more axes. As a result, the multi-directional wheels 112 can move in any direction, thereby enabling the container-transport AGV 100 to perform various maneuvers to flexibly move and change direction even in areas having limited space. In some embodiments, the multi-directional wheels 112 may be Mecanum wheels; although, other types of wheel are also possible and contemplated.

As depicted in FIG. 1D, the container-transport AGV 100 may include the user communication unit 142 for interacting with a user (e.g., a human worker). In some embodiments, the user communication unit 142 may include one or more visual interface devices 176 for interacting with the user via visual communication (e.g., display screen, touchscreen, projector, etc.) and/or one or more voice interface devices 178 for interacting with the user via voice communication (e.g., microphone, speaker, speech recognition device, etc.). In some embodiments, the container-transport AGV 100 may receive user input and/or user commands from the user and render information to the user via the visual interface device 176 and/or the voice interface device 178. For example, the human worker may replenish an item type (e.g., corresponding to a given item identifier (ID)), and provide a voice input via the microphone or use the touchscreen to update the number of items of the item type in the data store. In another example, the human worker may provide a voice command via the microphone instructing the container-transport AGV 100 to transport a container to a target position (e.g., "bring container C030387 to storage slot S115 of storage aisle 3"). Responsive to receiving the voice command from the user, the container-transport AGV 100 may analyze the voice command using the speech recognition device to determine the container being transported and its target position, reference the planogram of the storage facility to localize the current position of the container and the target position of the container, retrieve the container from the current position of the container, and transport the container to the target position of the container.

In some embodiments, the container-transport AGV 100 may include a guidance unit (not shown) to reposition or navigate the container-transport AGV 100 in the operating environment. For example, the container-transport AGV 100 may use the guidance unit to reposition itself relative to the first position from which the object is retrieved or the second position to which the object is transported. In another example, the container-transport AGV 100 may use the guidance unit to navigate from a first area to a second area to transport an object from an initial position of the object in the first area to a new position of the object in the second area. In some embodiments, the guidance unit may include one or more sensors. Examples sensors of the guidance unit include, but are not limited to, vision sensors (e.g., camera, etc.), reader devices (e.g., marker scanner, etc.), etc. Other types of sensors are also possible and contemplated.

In some embodiments, the vision sensors may be image sensors capable of recording images (e.g., video images and still images), recording frames of a video stream, etc. In some embodiments, the vision sensors may be mounted on the container-transport AGV 100 and may capture images of surrounding environments within their sensor range. In some embodiments, the container-transport AGV 100 may analyze the captured images to determine its current position and/or to detect various objects present in the surrounding environment (e.g., containers, human workers, other AGVs, etc.). The container-transport AGV 100 may then adaptively reposition itself relative to the detected object (e.g., align with the container placed on the shelving unit), and/or determine a travel path to navigate through the detected objects (e.g., avoid collision with human workers, other AGVs, etc.) and then proceed accordingly.

In some embodiments, the reader devices may be optical scanners capable of performing read operations to read graphic markers. Non-limiting examples of the graphic marker may include, but are not limited to, a barcode, Quick Response (QR) code, Radio Frequency Identification (RFID) label, etc. In some embodiments, a graphic marker may be attached to various objects and/or various locations in the operating environment. For example, graphic markers may be attached to containers, shelving units, inventory items, AGVs, etc. In another example, graphic markers may be attached to the storage slots at which containers may be placed on a shelving unit, the designated positions at which containers may be placed on the floor surface in front of a storage aisle, etc. In some embodiments, the reader devices may read a graphic marker to obtain the unique ID of an object and/or the location to which the graphic marker is attached. The container-transport AGV 100 may then use these unique ID to identify the object to be transported, align itself to the position of the object, navigate between different locations in the operating environment, etc.

Figure 1K:
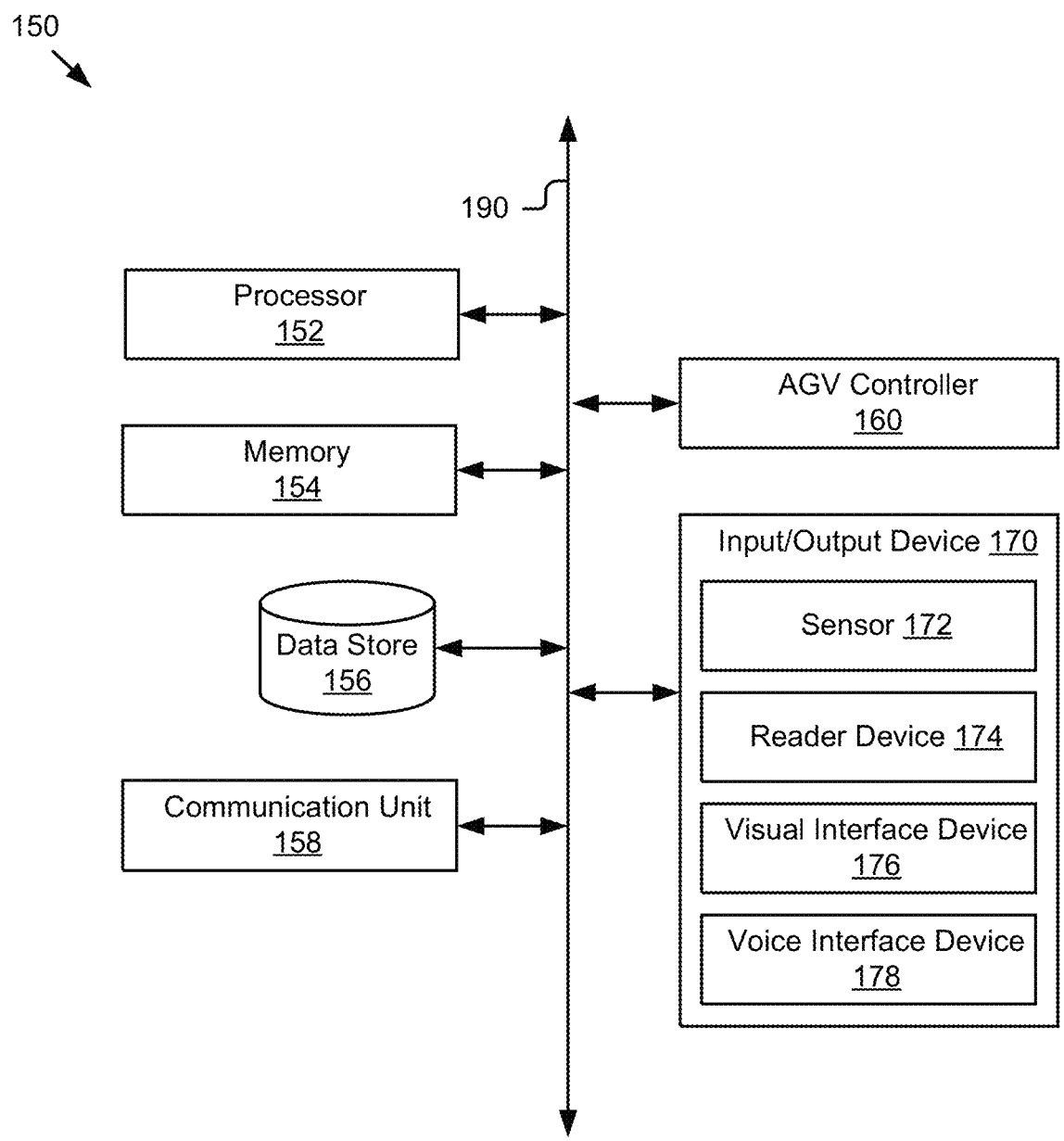
FIG. 1K is a block diagram of an example computing device.

FIG. 1K illustrates a computing device 150 representing the architecture of the container-transport AGV 100. As depicted, the computing device 150 may include a processor 152, a memory 154, a data store 156, a communication unit 158, the AGV controller 160, and one or more input/output devices 170. The components of the computing device 150 may be communicatively coupled by a bus 190. The computing device 150 depicted in FIG. 1K is provided by way of example and it should be understood that they may take other forms and include additional or fewer components without departing from the scope of the present disclosure.

For example, various components of the computing device 150 may be coupled for communication using a variety of communication protocols and/or technologies including, e.g., communication buses, software communication mechanisms, computer networks, etc. While not shown, the computing device 150 may include various operating systems, sensors, additional processors, and other physical configurations. Although FIG. 1K only illustrates a single processor 152, memory 154, data store 156, etc., it should be understood that the computing device 150 may include a plurality of instances for one or more of these components.

The processor 152 may execute software instructions by performing various input, logical, and/or mathematical operations. The processor 152 may have various computing architectures to method data signals including, for example, a complex instruction set computer (CISC) architecture, a reduced instruction set computer (RISC) architecture, and/or an architecture implementing a combination of instruction sets. The processor 152, which may include one or more processors, may be physical and/or virtual, and may include a single core or plurality of processing units and/or cores. In some embodiments, the processor 152 may be capable of generating and providing electronic signals to other computing entities (e.g., server, other AGVs, etc.), performing complex tasks such as image processing, AGV alignment and/or navigation, etc. In some embodiments, the processor 152 may be coupled to the memory 154 via the bus 190 to access data and instructions therefrom and store data therein. The bus 190 may couple the processor 152 to the other components of the computing device 150 including, for example, the AGV controller 160, the memory 154, the data store 156, the communication unit 158, and/or the input/output devices 170.

The memory 154 may store and provide access to data to the other components of the computing device 150. The memory 154 may be included in a single computing device or a plurality of computing devices. In some embodiments, the memory 154 may store instructions and/or data that may be executed by the processor 152. For example, the memory 154 may store computer logic executed by the AGV controller 160, depending on the configuration. The memory 154 is also capable of storing other instructions and data, including, for example, an operating system, hardware drivers, software applications, databases, etc. The memory 154 may be coupled to the bus 190 for communication with the processor 152 and other components of computing device 150. The memory 154 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 152. In some embodiments, the memory 154 may include one or more of volatile memory and non-volatile memory (e.g., RAM, ROM, hard disk, optical disk, etc.). It should be understood that the memory 154 may be a single device or may include multiple types of devices and configurations.

The bus 190 may include a communication bus for transferring data between components of a computing device or between computing devices, a network bus system including a network or portions thereof, a processor mesh, a combination thereof, etc. In some embodiments, the server, the AGV controller 160, and various other components operating on the computing device 150 (operating systems, device drivers, etc.) may cooperate and communicate via a communication mechanism included in or implemented in association with the bus 190. The software communication mechanism may include and/or facilitate, for example, intermethod communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 158 may include one or more interface devices (I/F) for wired and wireless connectivity among the computing entities of the system (e.g., the server, the AGVs, etc.). For example, the communication unit 158 may include, but is not limited to, various types known connectivity and interface options. The communication unit 158 may be coupled to other components of the computing device 150 via the bus 190. The communication unit 158 may be coupled to a network (e.g., the Internet, an intranet, etc.), depending on the configuration. In some embodiments, the communication unit 158 may link the processor 152 to the network, which may in turn be coupled to other processing systems. The communication unit 158 may provide other connections to a network, servers, and/or computing devices using various standard communication protocols.

The data store 156 may include a non-transitory storage medium that stores various types of data and provides access to the data. The data stored by the data store 156 may be organized and queried using various criteria. For example, the data store 156 may include data tables, databases, or other organized collections of data. In some embodiments, the data store 156 may be included in the computing device 150 or in another computing system and/or storage system distinct from but coupled to or accessible by the computing device 150. In some embodiments, the data store 156 may be incorporated with the memory 154 or may be distinct therefrom. In some embodiments, the data store 156 may store data associated with a database management system (DBMS) operable on the computing device 150. For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 156 may include, but is not limited to, AGV data, container data, location data, planogram data, map data, etc. For example, the data store 156 may store the AGV ID of the container-transport AGV 100, the container ID of the container transported by the container-transport AGV 100, the first position in the first area from which the container is retrieved, the second position in the second area to which the container is transported, the location attributes of the first position of the object and the second position of the object, etc. In some embodiments, the location attributes of the first position of the object or the second position of the object may indicate the distances between these positions and one or more points of reference (e.g., distance to the floor surface, distance to an end point of the shelving unit, etc.). In some embodiments, the data store 156 may also store the planogram and the facility map describing the operating environment. In the context of the storage facility, the planogram may specify the items stored in each storage aisle of the storage facility and the storage location of the items within the storage aisle. The planogram may also indicate the location attributes of these storage locations. In some embodiments, the facility map may indicate various areas of the storage facility (e.g., replenishment area, designated area for placing the shelving units to be unloaded, designated area for placing the containers in front of each storage aisle, etc.). Other types of data are also possible and contemplated.

The input/output devices 170 may include any device for inputting and outputting information to and from the computing device 150. The input/output devices 170 may be coupled to the computing device 150 directly or through intervening Input/Output (I/O) controllers. As depicted in FIG. 1K, the input/output devices 170 may include the visual interface device 176 for interacting with the user via visual communication and the voice interface device 178 for interacting with the user via voice communication. In some embodiments, the visual interface device 176 and the voice interface device 178 may include one or more peripheral devices for receiving user input and user commands from the user and rendering information to the user. Non-limiting examples of the visual interface device 176 include, but are not limited to, display screen, touchscreen, 3D projector, etc. Non-limiting examples of the voice interface device 178 include, but are not limited to, microphone, speaker, speech recognition interface, etc. It should be understood that the visual interface device 176 and the voice interface device 178 may include other types of peripheral devices such as a keyboard (e.g., a virtual keyboard), a pointing device (e.g., a virtual mouse device), etc.

As depicted in FIG. 1K, the input/output devices 170 may include one or more sensors 172. Non-limiting examples of the sensors 172 include, but are not limited to, vision sensors (e.g., camera and/or other image capture devices), object detection sensors, dimension sensors configured to estimate dimensions of an object (e.g., length, width, height, diameter, etc.), distance sensors, etc. As depicted in FIG. 1K, the input device 170 may also include a reader device 174. As discussed elsewhere herein, the reader device 174 may be a marker scanner that can read the graphic markers attached to various objects and/or locations. Non-limiting examples of the reader device 174 include, but are not limited to, barcode scanners, QR code scanner, RFID reader, etc. Other types of input/output device are also possible and contemplated.

The AGV controller 160 may include computer logic executable by the processor 152 to control one or more operations of the container-transport AGV 100 in the operating environment. For example, the AGV controller 160 may control the operations of the container-transport AGV 100 to transport the container between different locations in the storage facility. In some embodiments, the AGV controller 160 may be implemented in the container-transport AGV 100. Alternatively, the AGV controller 160 may be implemented in a server. In some embodiments, the AGV controller 160 may be implemented using software executable by one or more processors of one or more computer devices, using hardware, such as but not limited to a field-programmable gate array (FPGA), an application-specific integrated circuit (ASIC), etc., and/or a combination of hardware and software, etc.

In some embodiments, the AGV controller 160 may communicate with other components of the computing device 150 via the bus 190 and/or the processor 152, and communicate with other entities of the system via the network. In some embodiments, the AGV controller 160 may be a set of instructions executable by the processor 152 to provide its functionality. In further embodiments, the AGV controller 160 may be storable in the memory 154 and accessible and executable by the processor 152 to provide its functionality. In any of the foregoing embodiments, the AGV controller 160 may be adapted for cooperation and communication with the processor 152 and other components of the computing device 150. For example, the AGV controller 160 may receive input data from one or more input/output devices 170 (e.g., a captured image, graphic marker ID, container ID, target position of the container, etc.), process the input data, and provide one or more outputs via the visual interface device 176 and the voice interface device 178 (e.g., voice message confirming user input, execution status of user command, etc.). The AGV controller 160 is described in additional detail below with reference to at least FIGS. 2-5M.

Figure 2:
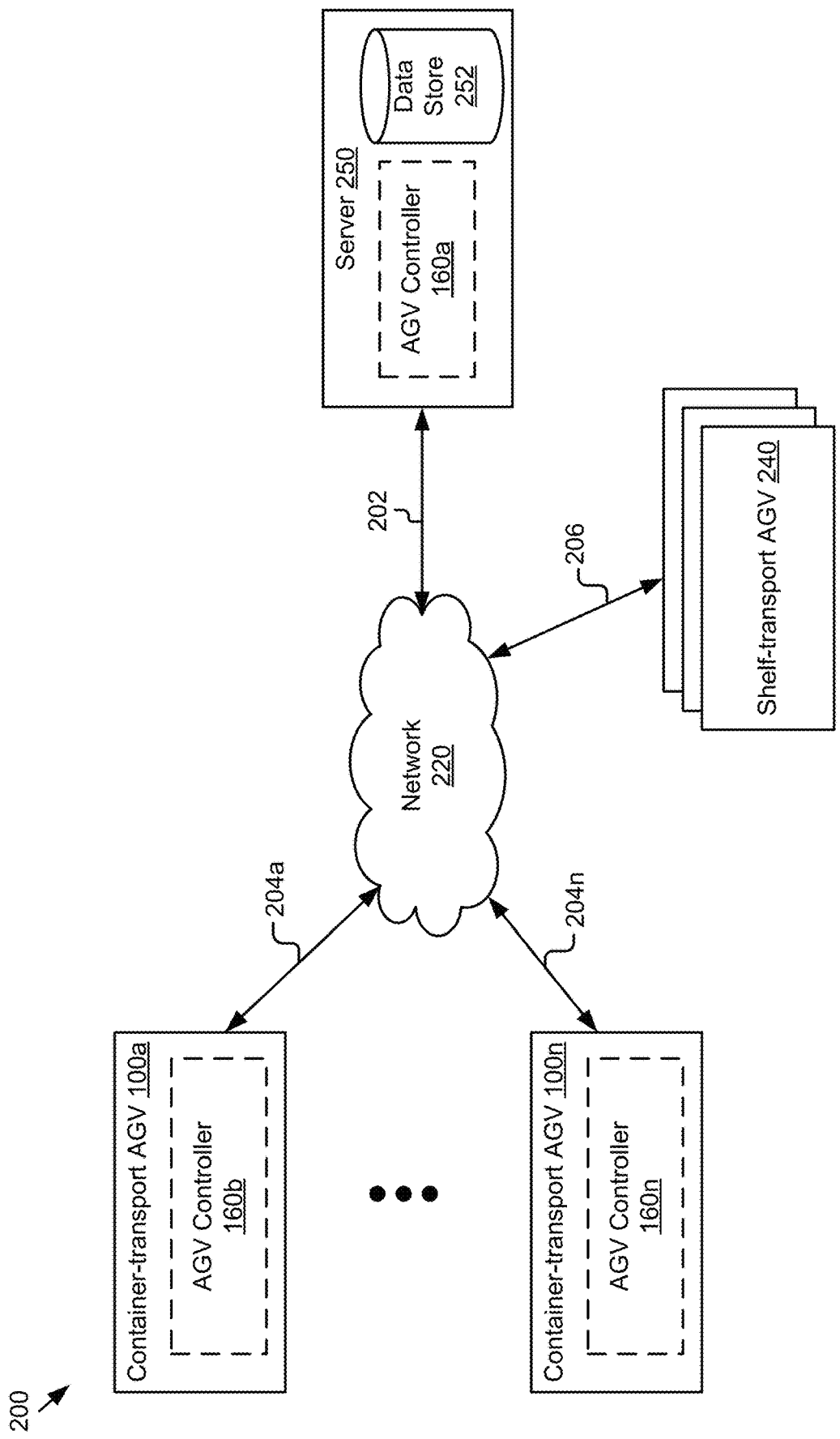
FIG. 2 is a block diagram of an example system for automatically transporting an object using a container-transport AGV.

FIG. 2 is a block diagram of an example system 200 for automatically transporting objects between different locations in an operating environment using the container-transport AGV 100. As depicted, the system 200 includes a server 250, one or more container-transport AGVs 100, and one or more shelf-transport AGVs 240 coupled for electronic communication via a network 220. It should be understood that the system 200 depicted in FIG. 2 is provided by way of example, and that the system 200 and/or further systems contemplated by the present disclosure may include additional and/or fewer components, may combine components and/or divide one or more of the components into additional components, etc. For example, the system 200 may include any number of servers 250, the container-transport AGVs 100, or the shelf-transport AGVs 240.

The network 220 may be a conventional type, wired and/or wireless, and may have numerous different configurations including a star configuration, token ring configuration, or other configurations. Furthermore, the network 220 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 220 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 220 is a wireless network using a connection such as DSRC (Dedicated Short Range Communication), WAVE, 802.11p, a 3G, 4G, 5G+ network, WiFi™, satellite networks, or other suitable networks. Although FIG. 2 illustrates a single block for the network 220 that couples to the server 250, the container-transport AGVs 100, and the shelf-transport AGVs 240, it should be understood that the network 220 may in practice comprise any number of combination of networks, as noted above. As depicted in FIG. 2, the server 250, the container-transport AGVs 100, and the shelf-transport AGVs 240 may be communicatively coupled to the network 220, as respectively represented by signal lines 202, 204a . . . 204n, and 206. Thus, the server 250, the container-transport AGVs 100, and the shelf-transport AGVs 240 may send and receive data to and from other entities of the system 200 via the network 220.

As depicted in FIG. 2, the system 200 may include one or more AGVs, which may include various types of robotic vehicles operating in the operating environment. For example, the system 200 may include container-transport AGVs 100a . . . 100n for transporting objects that are capable of storing inventory items such as containers, shelf-transport AGVs 240 for transporting shelving units that are capable of accommodating these objects, etc. In some embodiments, the shelving unit may include one or more shelves on which the objects (e.g., the containers) may be placed. Non-limiting examples of the shelving unit include, but are not limited to, a shelf, a rack, a cart, etc. In some embodiments, the container-transport AGVs 100a . . . 100n and the shelf-transport AGVs 240 may cooperate to perform one or more tasks in the operating environment. For example, in the context of a storage facility, the shelf-transport AGV 240 may automatically transport a shelving unit with one or more containers placed thereon to a designated position in the aisle area of the storage facility. For a container in the one or more containers, the container-transport AGVs 100a . . . 100n may automatically transport the container from the shelving unit to the floor surface in front of the storage aisle associated with the container, thereby automatically unloading the one or more containers from the shelving unit to their corresponding storage aisle. It should be understood that the system 200 may include other types of AGVs that perform other tasks in the operating environment.

The server 250 includes a hardware and/or virtual server that includes a processor, a memory, and network communication capabilities (e.g., a communication unit). In some embodiments, the server 250 may implement a management system managing various operations in the storage facility. For example, the managing system may manage the placement of inventory items into various containers. The server 250 may be communicatively coupled to the network 220, as reflected by signal line 202. In some embodiments, the server 250 may send and receive data to and from other entities of the system 200 (e.g., the container-transport AGVs 100, the shelf-transport AGVs 240, etc.). As depicted, the server 250 may include an instance of the AGV controller 160a. The server 250 may also include a data store 252 that stores various types of data for access and/or retrieval by the AGV controller 160a. In some embodiments, the data stored by the data store 252 may include, but is not limited to, planogram data, item data, container data, AGV data, etc. In some embodiments, the item data of an item may include item ID, item quantity, item order velocity, container IDs of one or more containers storing the item, etc. The container data of a container may include container ID, item ID and item quantity of one or more items stored in the container, container position of the container (e.g., storage aisle ID, slot ID), location attributes of the container position (e.g., distance between the container position to one or more point of references, etc.), etc. In some embodiments, the AGV data of the AGV may include AGV ID, AGV position of the AGV, container ID of one or more containers transported by the AGV, execution status of the AGV task performed by the AGV, etc. Other types of data are also possible and contemplated.

As illustrated in FIG. 2, the AGV controller 160a, 160b, and/or 160n may be implemented in the container-transport AGV(s) 100 and/or in the server 250. In some embodiments, an AGV controller 160a . . . 160n may be configured to communicate with other components of a container-transport AGV 100a . . . 100n to control the operations of the container-transport AGV 100 via the bus 190 and/or the processor 152. In some embodiments the AGV controller 160a may be partially or completely operable on the server 250 and may be configured to communicate with the container-transport AGV 100a or 100b to control its operations via the network 220. In some embodiments, the AGV controller 160 (e.g., the AGV controller 160a operable on the server 250) may control and/or coordinate the operations of multiple container-transport AGVs 100a . . . 100n and/or the shelf-transport AGVs 240 in the operating environment.

Figure 3A:
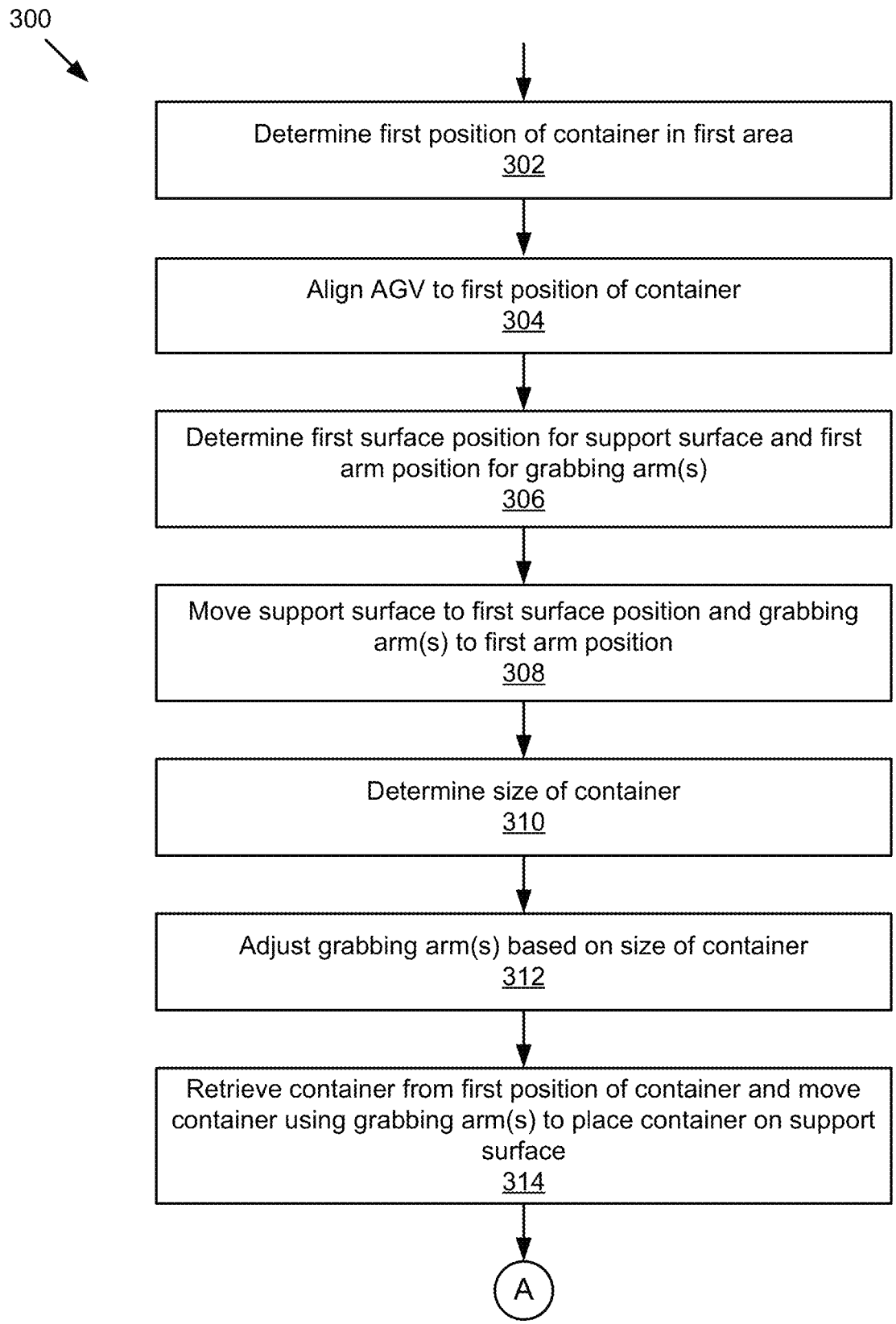
FIGS. 3A and 3B illustrate a flowchart of an example method for automatically transporting the object using a container-transport AGV.
Figure 3B:
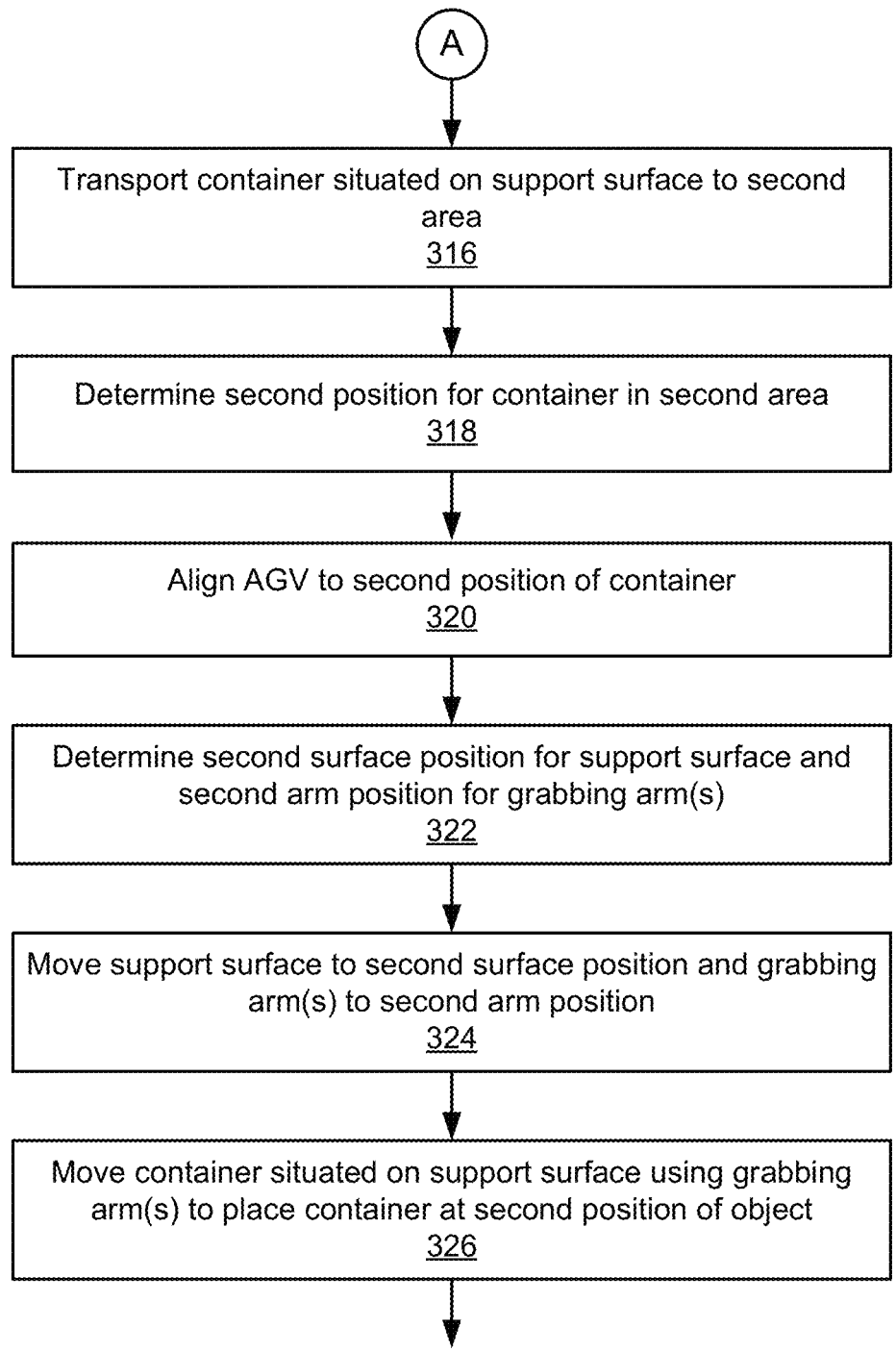

FIGS. 3A and 3B illustrate an example method 300 for automatically transporting an object between different locations in the operating environment using the container-transport AGV 100. The method 300 is described below in the context of a storage facility in which the object may be a container that stores inventory items and the container-transport AGV 100 may automatically transport the container between different locations in the storage facility. In some embodiments, the method 300 may be performed by the container-transport AGV 100 as the container-transport AGV 100 is controlled by the AGV controller 160.

In block 302, the AGV controller 160 may determine a first position of a container in a first area of the storage facility. In some embodiments, the AGV controller 160 may navigate the container-transport AGV 100 to the first area in which one or more containers are placed, determine a container to be transported from among the one or more containers, and determine the first position at which the container is located. In some embodiments, to determine the container to be transported, the reader device 174 of the container-transport AGV 100 may scan graphic markers (e.g., QR codes) attached to the containers or the storage slots that the containers occupy to obtain the container IDs of the containers and/or the slot IDs of the storage slots. The AGV controller 160 may then determine the container to be transported among these containers based on the container IDs and/or the slot IDs. In some embodiments, the AGV controller 160 may determine the container being transported to be the container that has the lowest distance to a point of reference. As an example, the container-transport AGV 100 may unload multiple containers from a shelving unit to the floor surface. In this example, the AGV controller 160 may determine the container on the shelving unit that has the lowest distance to an end point of the shelving unit that is designated to be the point of reference, and determine the container being transported to be this container.

In some embodiments, to determine the first position of the container, the AGV controller 160 may retrieve the first position at which the container is located and the location attributes of the first position from the data store 156 and/or the data store 252. Additionally or alternatively, the AGV controller 160 may determine the first position of the container and its location attributes based on the sensor data captured by one or more sensors 172 of the container-transport AGV 100. For example, the vision sensor of the container-transport AGV 100 may capture one or more images of the container. The AGV controller 160 may analyze the captured images and determine the first position of the container and its location attributes based on the captured images and the sensor position of the vision sensor that captured these images. Other implementations for determining the first position of the container and its location attributes are also possible and contemplated.

FIGS. 5A-5M illustrate an example scenario in which a container-transport AGV 100 may transport a container from a first position of the container to a second position. The second position may be a target position to which the container needs to be transported and may be referred to herein as the second position of the container. In this example, the container-transport AGV 100 may unload one or more containers from a shelving unit. As depicted in stage 500 in FIG. 5A, the AGV controller 160 may navigate the container-transport AGV 100 to a position proximate to the shelving unit 502 on which the containers are situated. The distance between the position to which the container-transport AGV 100 is navigated and the shelving unit 502 may satisfy a proximity threshold (e.g., less than the length of the paddle 132, e.g., 25 cm). In the example depicted in FIGS. 5A-5M, the AGV controller 160 may determine that the container 504 is the container to be transported and that the container 504 is located at a first position on the top shelf of the shelving unit 502. As discussed elsewhere herein, the AGV controller 160 may also determine the location attributes of the first position of the container 504. For example, the AGV controller 160 may determine that the distance between the first position of the container 504 and the floor surface is 150 cm, the distance between the first position of the container 504 and the end point 501 of the shelving unit 502 is 35 cm, etc.

In block 304, the AGV controller 160 may align the container-transport AGV 100 with the container in the first area. To align the container-transport AGV 100 with the container, the AGV controller 160 may reposition the container-transport AGV 100 relative to the first position of the container such that the container-transport AGV 100 may be aligned to a surface of the container. In some embodiments, the alignment position at which the container-transport AGV 100 is aligned with the container may be indicated by a first graphic marker attached to the container, the storage slot on the shelving unit, or the floor surface, etc., such that when the reader device 174 of the container-transport AGV 100 detects the first graphic marker (e.g., QR code), the container-transport AGV 100 is aligned with the container. In some embodiments, the vision sensor of the container-transport AGV 100 may capture one or more images of the container from the perspective of the container-transport AGV 100. The AGV controller 160 may determine the alignment position relative to the container based on the captured images, and relocate the container-transport AGV 100 to the alignment position, thereby aligning the container-transport AGV 100 with the container. Other implementations for aligning the container-transport AGV 100 with the container are also possible and contemplated.

Figure 5A:
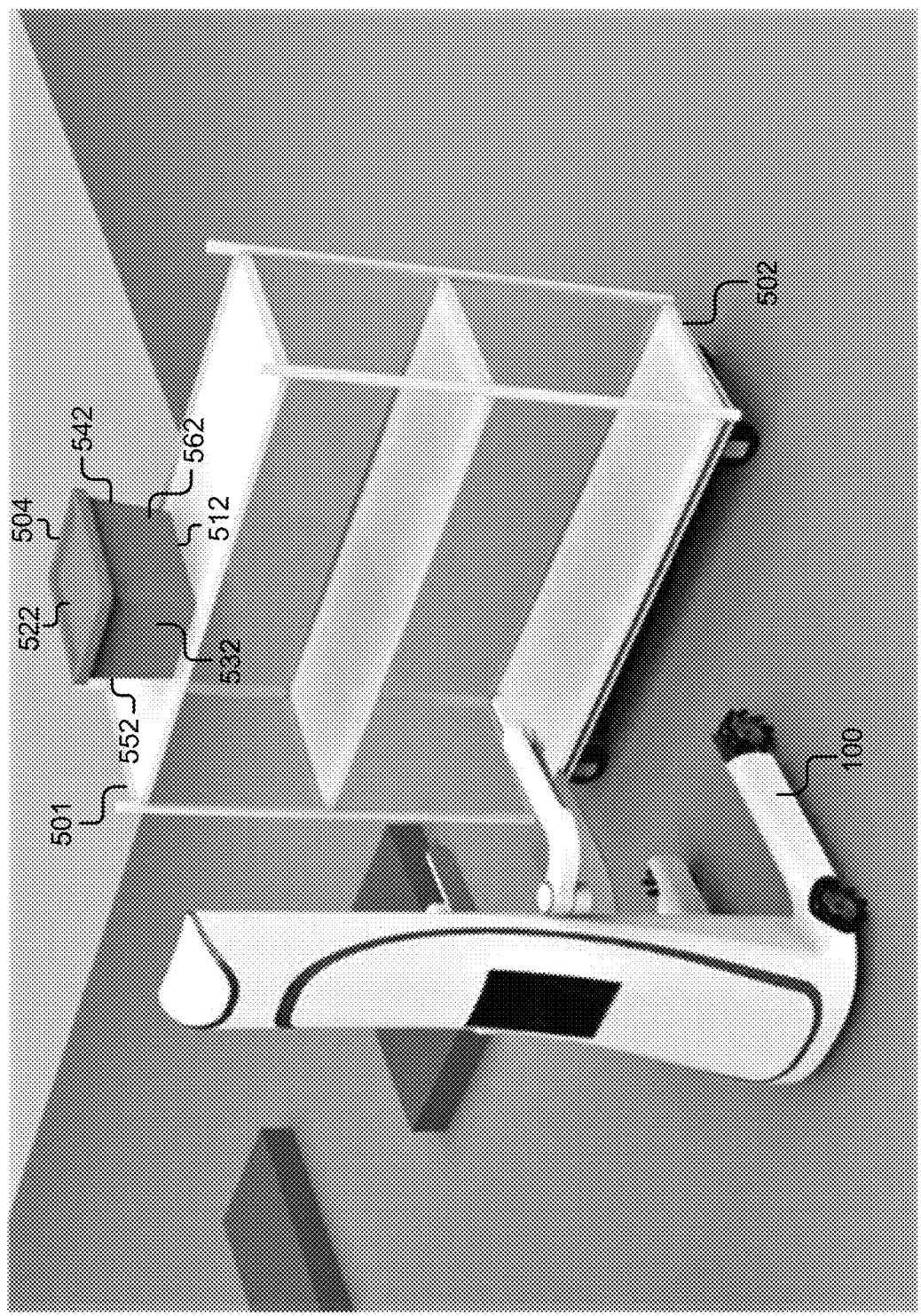
FIGS. 5A-5M illustrate an example scenario in which an example container-transport AGV automatically transports an object from a first position to a second position.

Continuing the example depicted in FIGS. 5A-5M, the container 504 to be transported may include a bottom surface 512, a top surface 522, a front surface 532, a back surface 542, a side surface 552, and a side surface 562 as depicted in FIG. 5A. These surfaces may be referred to herein as object surfaces of the container 504, although a container 504 may have other configurations or surfaces. In this example, when the AGV controller 160 relocates the container-transport AGV 100 towards the shelving unit 502, the AGV controller 160 may align the container-transport AGV 100 with the container 504 on the shelving unit 502 based on the location attributes of the first position of the container 504. As a result of this alignment, the container-transport AGV 100 may face the front surface 532 of the container 504.

In block 306, the AGV controller 160 may determine a first surface position for the support surface 140 and a first arm position for the plurality of grabbing arms 120 of the container-transport AGV 100 based on the first position of the container. In some embodiments, when the container is located at the first position, the AGV controller 160 may determine the first surface position for the support surface 140 that has the distance between the first surface position and the bottom surface of the container satisfying a first distance threshold (e.g., less than 0.5 cm). Thus, the support surface 140 may be moved to the first surface position that is proximate to the bottom surface of the container, and therefore the movement of the container from the first position of the container to the support surface 140 of the container-transport AGV 100 can be facilitated. In some embodiments, when the container is located at the first position, the AGV controller 160 may determine the first arm position for the plurality of grabbing arms 120 that has the distance between the first arm position and the top surface of the container satisfying a second distance threshold (e.g., more than 3 cm). Thus, the plurality of grabbing arms 120 may be moved to the first arm position that is at a certain distance from the top surface of the container, and therefore the likelihood of the container being dropped when the plurality of grabbing arms 120 hold the container may be reduced.

In block 308, the AGV controller 160 may actuate the elevator mechanism 104 to vertically move the support surface 140 along the AGV body 102 of the container-transport AGV 100 to the first surface position relative to the first position of the container. Similarly, the AGV controller 160 may actuate the elevator mechanisms 106 to vertically move the plurality of grabbing arms 120 along the AGV body 102 of the container-transport AGV 100 to the first arm position relative to the first position of the container. Thus, the support surface 140 and the plurality of grabbing arms 120 may vertically move towards the first position at which the container is located.

Figure 5C:
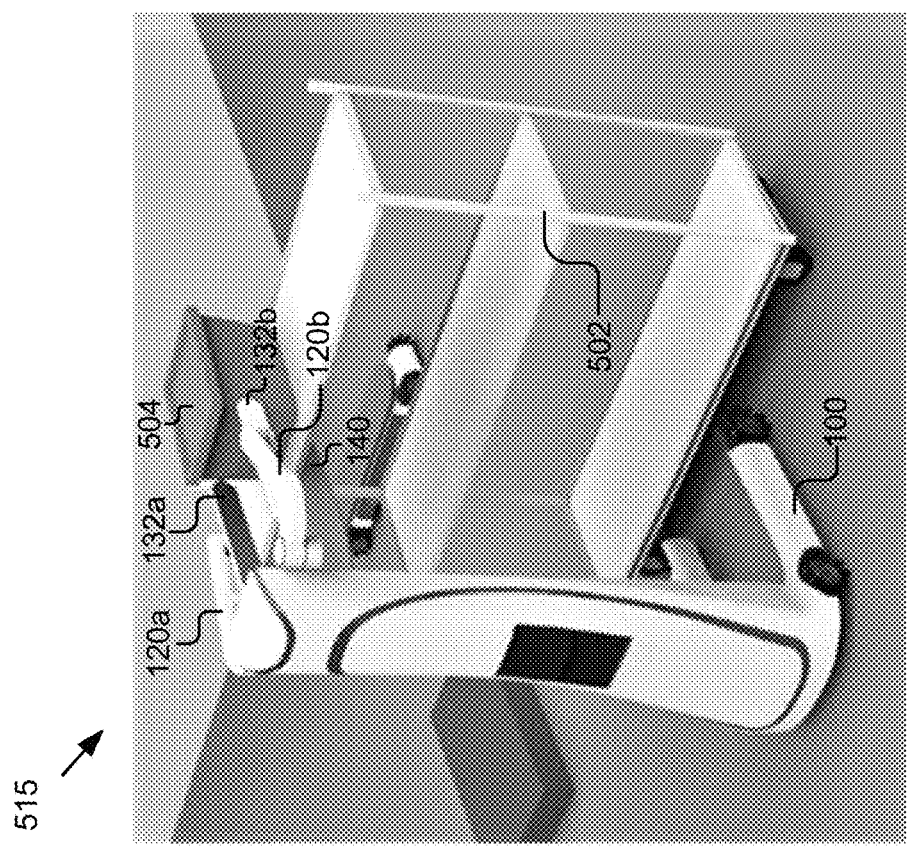
Figure 5B:
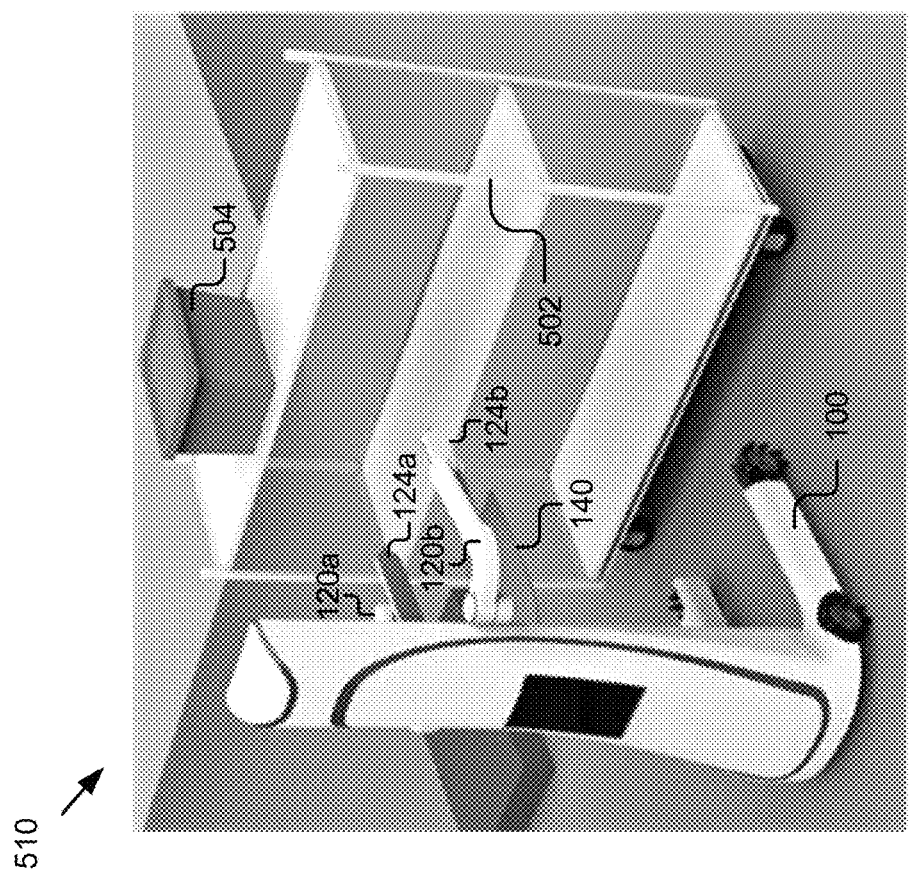

Continuing the example depicted in FIGS. 5A-5M, in stage 510 illustrated in FIG. 5B, the support surface 140 and the plurality of grabbing arms 120 may vertically move upward along the AGV body 102 towards the first position of the container 504 on the shelving unit 502. In stage 515 illustrated in FIG. 5C, as the support surface 140 reaches the first surface position and the plurality of grabbing arms 120 reach the first arm position, the support surface 140 may be proximate to the bottom surface 512 of the container 504 and the plurality of grabbing arms 120 may be at a distance relative to the top surface 522 of the container 504.

In block 310, the AGV controller 160 may determine the object size of the container. The object size of the container may indicate one or more dimensions of the container (e.g., width, length, height, diameter, axis length, etc.). In some embodiments, the AGV controller 160 may retrieve the object size of the container from the data store 156 and/or the data store 252. Alternatively, the AGV controller 160 may determine the object size of the container based on the sensor data captured by one or more sensors 172 of the container-transport AGV 100. For example, the vision sensor of the container-transport AGV 100 may capture one or more images of the container. The AGV controller 160 may analyze the captured images, and determine the object size of the container based on the captured images. In another example, the container-transport AGV 100 may determine the object size of the container using dimension sensors integrated in the plurality of grabbing arms 120. Other implementations for determining the object size of the container are also possible and contemplated.

In block 312, the AGV controller 160 may adjust one or more grabbing arms 120 of the container-transport AGV 100 based on the object size of the container. In some embodiments, for a grabbing arm 120 in the plurality of grabbing arms 120, the AGV controller 160 may actuate the motors in the shoulder element 122 of the grabbing arm 120 to horizontally pivot the grabbing arm 120 around the shoulder element 122. The AGV controller 160 may also actuate the motors in the wrist element 126 of the grabbing arm 120 to horizontally pivot the hand element 124 of the grabbing arm 120 around the wrist element 126. Thus, by horizontally pivoting the grabbing arm 120 around the shoulder element 122 and/or horizontally pivoting the hand element 124 of the grabbing arm 120 around the wrist element 126, the distance between the plurality of paddles 132 of the plurality of grabbing arms 120 may be adjusted to be equal to the object size of the container, and thus the container can fit between the plurality of paddles 132 of the plurality of grabbing arms 120. It should be understood that the AGV controller 160 may adjust one grabbing arm 120 or multiple grabbing arms 120 in the plurality of grabbing arms 120. These grabbing arms 120 and/or their hand element 124 may be horizontally rotated with the same or different rotation angles (e.g., 15° v. 20°) in the same or different directions (e.g., towards the left v. towards the right relative to the AGV body 102). Other implementations for adjusting the one or more grabbing arms 120 of the container-transport AGV 100 are also possible and contemplated.

Continuing the example depicted in FIGS. 5A-5M, in stage 510 illustrated in FIG. 5B, the grabbing arm 120a and its hand element 124 may be horizontally rotated to the right relative to the AGV body 102, and the grabbing arm 120b and its hand element 124 may be horizontally rotated to the left relative to the AGV body 102. Thus, in stage 515 illustrated in FIG. 5C, the grabbing arm 120a, the grabbing arm 120b, and their hand element 124 may be rotated inward relative to the AGV body 102 as compared to stage 510 illustrated in FIG. 5B. As a result, the distance between the paddle 132a of the grabbing arm 120a and the paddle 132b of the grabbing arm 120b may be adjusted to be equal to the width of the container 504, and thus the container 504 may fit between the paddle 132a of the grabbing arm 120a and the paddle 132b of the grabbing arm 120b as illustrated in FIG. 5C. In some embodiments, the plurality of grabbing arms 120 and their hand elements 124 may horizontally pivot around the shoulder element 122 and the wrist element 126 while the plurality of grabbing arms 120 and the support surface 140 are vertically moving along the AGV body 102. These movements of the plurality of grabbing arms 120 and the support surface 140 may also be performed while the container-transport AGV 100 is navigating towards the shelving unit 502 and/or aligning with the container 504 on the shelving unit 502.

In block 314, responsive to moving the support surface 140 to the first surface position and moving the one or more grabbing arms 120 to the first arm position that are relative to the first position of the container and responsive to adjusting one or more grabbing arms 120 based on the object size of the container, the container-transport AGV 100 may retrieve the container from the first position of the container using the one or more grabbing arms 120. The one or more grabbing arms 120 may articulate to grasp the container from the first position of the container. The one or more grabbing arms 120 may hold the container and move the container towards the support surface 140 of the container-transport AGV 100 to place the container on the support surface 140.

In some embodiments, to retrieve the container from the first position of the container, a grabbing arm 120 in the plurality of grabbing arms 120 may slide the paddle 132 forward along a first object surface of the container. When the plurality of grabbing arms 120 slide their paddles 132 forward in parallel against multiple first object surfaces of the container, the container may be held between the plurality of paddles 132 of the plurality of grabbing arms 120. In some embodiments, the grabbing arm 120 may actuate the motors in the finger element 128 to bend the finger element 128 against a second object surface of the container to grasp the container. As the container is securely gripped by the paddle 132 and the finger element 128 of the plurality of grabbing arms 120, the plurality of grabbing arms 120 may slide their paddle 132 backward in parallel along their hand elements 124 to move the container towards the support surface 140 and place the container on the support surface 140.

Figure 5E:
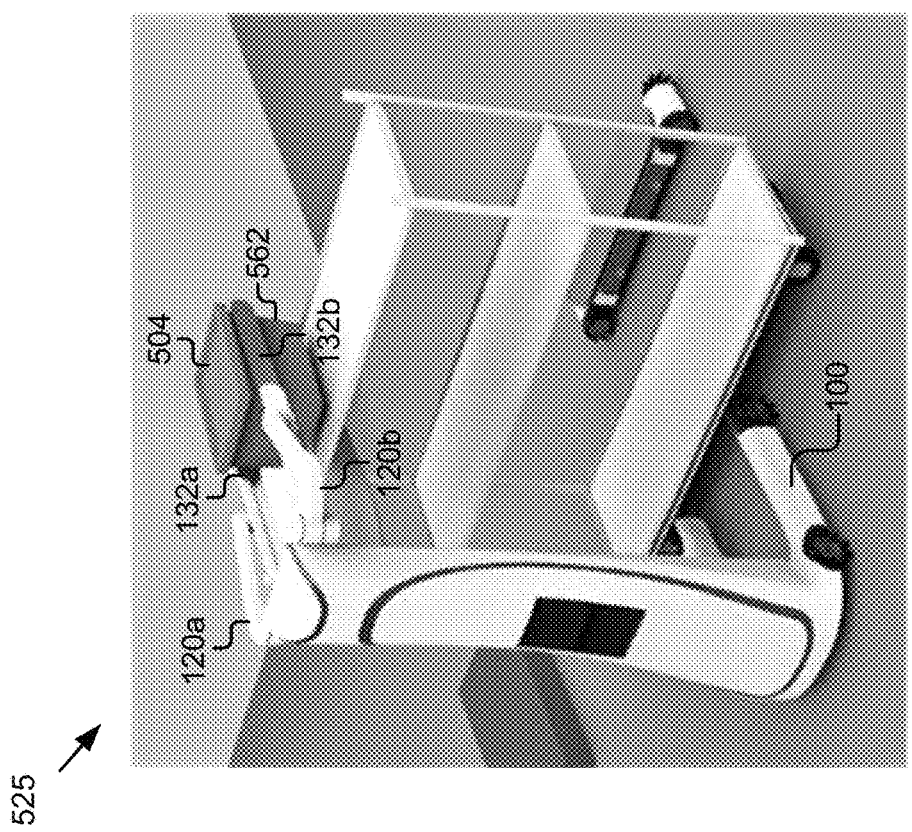
Figure 5D:
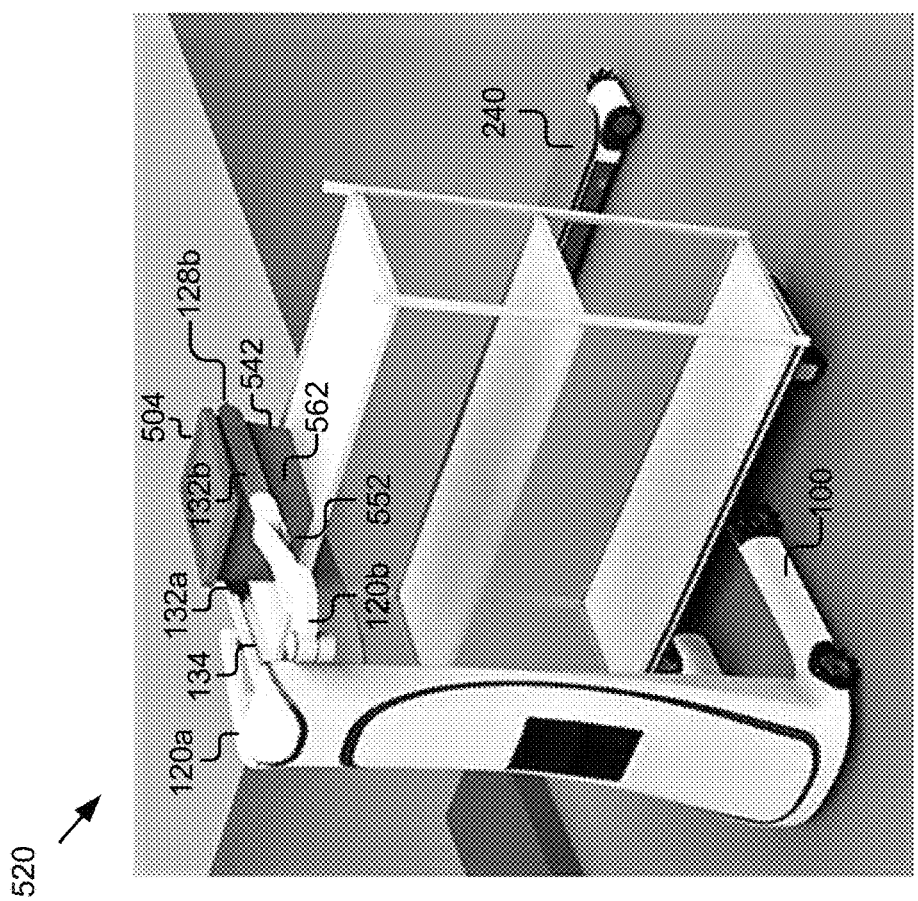

Continuing the example depicted in FIGS. 5A-5M, in stage 520 illustrated in FIG. 5D, the grabbing arm 120a and the grabbing arm 120b may be at the first arm position that has a certain distance to the top surface 522 of the container 504, and the support surface 140 may be at the first surface position that is proximate to the bottom surface 512 of the container 504 as discussed elsewhere herein. As depicted in FIG. 5D, the distance between the grabbing arm 120a and the grabbing arm 120b may be equal to the object size of the container 504. In this stage, the grabbing arm 120a may slide the paddle 132a forward along the channel 134 of its hand element 124. As the paddle 132a slides forward along the channel 134, the paddle 132a may slide along the side surface 552 of the container 504 and rest against the side surface 552 of the container 504 due to the adjusted position of the grabbing arm 120a. Similarly, the grabbing arm 120b may slide the paddle 132b forward along the channel 134 of its hand element 124. As the paddle 132b slides forward along the channel 134, the paddle 132b may slide along the side surface 562 of the container 504 and rest against the side surface 562 of the container 504 due to the adjusted position of the grabbing arm 120b. Thus, as the paddle 132a of the grabbing arm 120a rests against the side surface 552 of the container 504 and the paddle 132b of the grabbing arm 120b rests against the side surface 562 of the container 504, the grabbing arm 120a and the grabbing arm 120b may hold the container 504 between their paddles 132 as depicted in FIG. 5D.

In some embodiments, in stage 525 illustrated in FIG. 5E, the grabbing arm 120a may pivot the finger element 128a (not shown) to rest the finger element 128a against the back surface 542 of the container 504, and the grabbing arm 120b may pivot the finger element 128b to rest the finger element 128b against the back surface 542 of the container 504. For example, the grabbing arm 120a may pivot the finger element 128a inward relative to the paddle 132a at a pivot angle so that the finger element 128a may rest against the back surface 542. Similarly, the grabbing arm 120b may pivot the finger element 128b inward relative to the paddle 132b at a pivot angle so that the finger element 128b may also rest against the back surface 542. Thus, the container 504 may be securely held between the paddle 132a of the grabbing arm 120a and the paddle 132b of the grabbing arm 120b due to the paddles 132a and 132b and the finger element 128a and 128b resting on its object surfaces. As a result, the grabbing arm 120a and the grabbing arm 120b may move the paddle 132a and the paddle 132b in parallel to move the container 504 being held between these paddles 132. As depicted in FIG. 5E, the grabbing arm 120a and the grabbing arm 120b may lift the container 504 up from the shelf of the shelving unit 502 on which the container 504 is situated. This implementation is advantageous because it can avoid friction between the container 504 and the shelf surface that may cause damages to the container 504 during its movement.

Figure 5G:
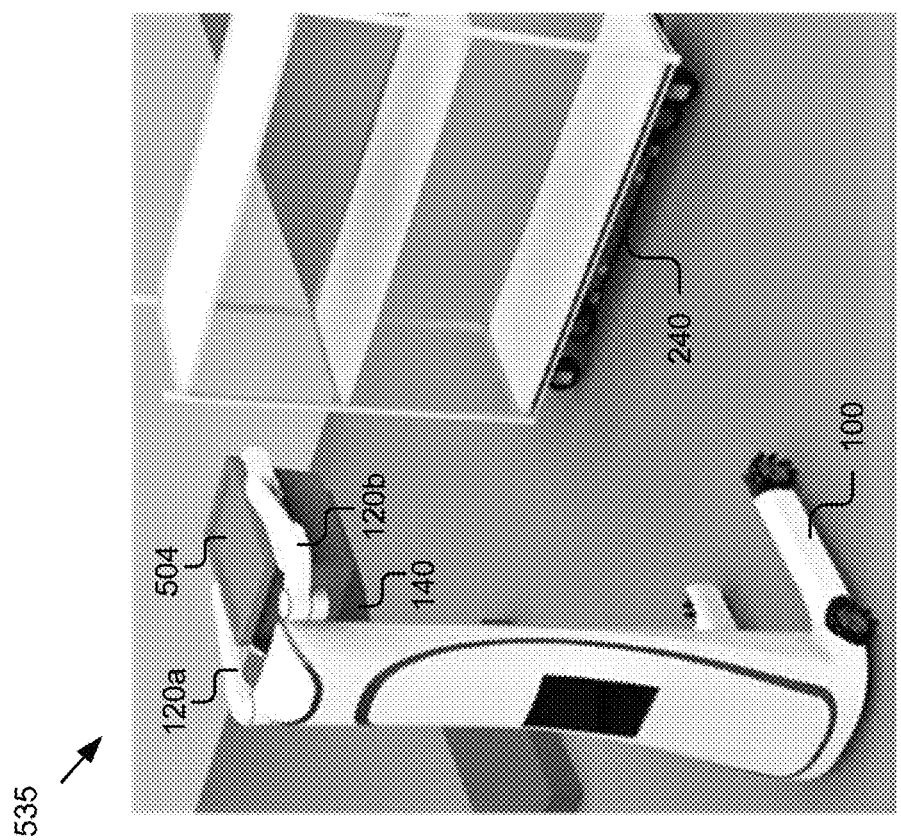
Figure 5F:
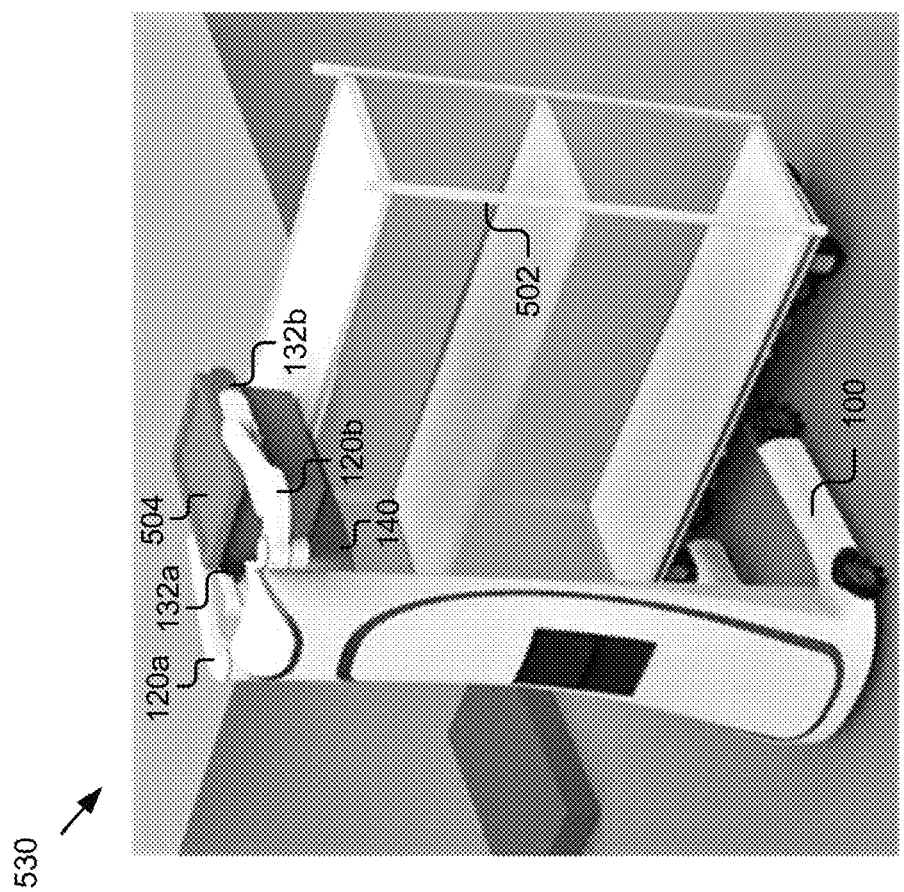

In stage 530 illustrated in FIG. 5F, the grabbing arm 120*a* may slide the paddle 132*a* backward along the channel 134 of its hand element 124, and the grabbing arm 120*b* may slide the paddle 132*b* backward along the channel 134 of its hand element 124. As depicted in FIG. 5F, the grabbing arm 120*a* and the grabbing arm 120*b* may slide the paddle 132*a* and the paddle 132*b* backward in parallel, thereby moving the container 504 being held between the paddle 132*a* and the paddle 132*b* towards the support surface 140 and place the container 504 on the support surface 140. When the support surface 140 is at the first surface position proximate to the bottom surface 512 of the container 504, the placement of the container 504 on the support surface 140 can be facilitated due to the proximity of the support surface 140 to the bottom surface 512 of the container 504. In some embodiments, instead of or in addition to holding the container 504 between the plurality of paddles 132 of the plurality of grabbing arms 120 and sliding the plurality of paddles 132 to move the container 504 being held between these paddles to the support surface 140, one or more paddles 132 may perform a sweeping movement to push the container 504 from the shelf of the shelving unit 502 to the support surface 140. Additionally or alternatively, one or more paddles 132 may couple to an engagement point of the container 504 (e.g., container handle, container rim, etc.), and pull or drag the container 504 onto the support surface 140. Other implementations for moving the container 504 to the support surface 140 are also possible and contemplated.

In stage 535 illustrated in FIG. 5G, the container 504 may be situated on the support surface 140 of the container-transport AGV 100. As depicted in FIG. 5G, when the container 504 is situated on the support surface 140, the container 504 may still be held between the paddle 132*a* of the grabbing arm 120*a* and the paddle 132*b* of the grabbing arm 120*b*. As illustrated, the paddles 132*a* and 132*b* and the finger element 128*a* and 128*b* of these grabbing arms 120 may remain resting on the object surfaces of the container 504. However, because the container 504 is now placed on the support surface 140, the support surface 140 may support the container 504 from underneath the container 504, and thus the grabbing arm 120*a* and the grabbing arm 120*b* may not be subjected to the weight of the container 504 during the transportation of the container 504, which may be advantageous because it can avoid dropping the container 504 even if one or more components of the grabbing arm 120*a* or the grabbing arm 120*b* encounter an unexpected failure. As depicted in FIG. 5G, when all containers are unloaded from the shelving unit 502, the shelf-transport AGV 240 may transport the shelving unit 502 to another location in the storage facility to be reused.

In block 316, responsive to placing the container on the support surface 140 of the container-transport AGV 100, the container-transport AGV 100 may transport the container situated on the support surface 140 to a second area where the container is released. In some embodiments, to transport the container to the second area, the guidance unit may reference the facility map of the storage facility, and determine a navigation path from the first area to the second area. To follow the navigation path to the second area, the reader device 174 may detect the graphic markers on the floor surface as the container-transport AGV 100 proceeds in the storage facility. In some embodiments, the guidance unit may map these graphic markers to the navigation path, and generate navigating instructions to follow the navigation path. The AGV controller 160 may then actuate the power motors and/or the driving actuators of the container-transport AGV 100 to move the container-transport AGV 100 based on the navigating instructions. As a result, the container-transport AGV 100 may follow the navigation path to transport the container situated on the support surface 140 from the first area to the second area. Other implementations for navigating the container-transport AGV 100 to the second area are also possible and contemplated.

Figure 5H:
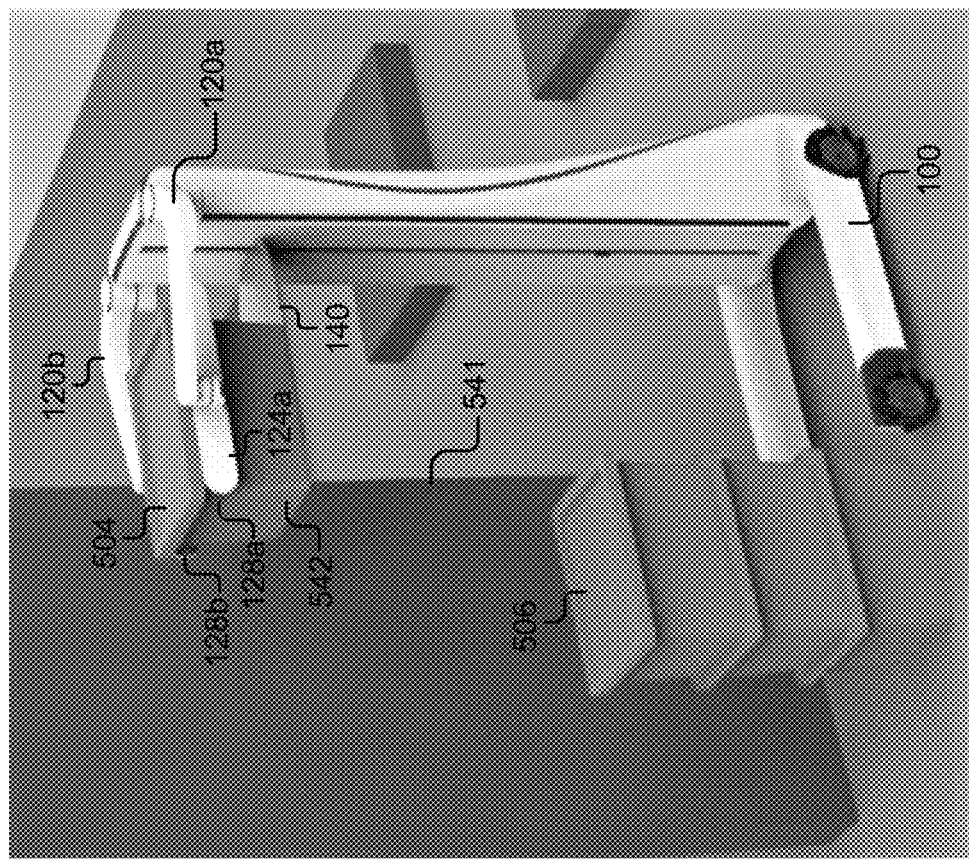

Continuing the example depicted in FIGS. 5A-5M, in stage 540 illustrated in FIG. 5H, the container-transport AGV 100 may transport the container 504 situated on the support surface 140 to a second area. In this example, the second area may be the designated area of the storage aisle where the items in the container 504 are stored. Thus, as the container 504 is transported to the second area, the container 504 may be automatically unloaded from the shelving unit 502 and transported to the storage aisle associated with the container 504.

In block 318, the AGV controller 160 may determine a second position for the container in the second area. In some embodiments, to determine the second position of the container, the AGV controller 160 may retrieve the second position to which the container needs to be transported and the location attributes of the second position from the data store 156 and/or the data store 252. Alternatively, the user communication unit 142 may receive a user command specifying the second position for the container. For example, the voice interface device 178 may receive a voice command "take container C030387 to storage slot S115 of storage aisle 3" from the human worker. The AGV controller 160 may then extract the second position of the container from the user command, and reference the planogram of the storage facility to determine the location attributes of the second position. In some embodiments, the AGV controller 160 may determine the second position of the container and its location attributes based on the sensor data captured by one or more sensors 172 of the container-transport AGV 100. For example, the vision sensor of the container-transport AGV 100 may capture one or more images of the second area. The AGV controller 160 may analyze the captured images, and determine the second position for the container and the location attributes of the second position based on the captured images.

Continuing the example depicted in FIGS. 5A-5M, in stage 540 illustrated in FIG. 5H, the AGV controller 160 may determine the second position for the container 504 in the second area. In this example, the containers in the second area may need to be organized into one or more container stacks placed on the floor surface. The AGV controller 160 may analyze the images of the second area captured by the vision sensor to determine the container stacks in the second area and the stack height of the container stacks. If the stack height of a particular container stack do not satisfy a stack height threshold (e.g., less than 5 containers), the AGV controller 160 may determine the container located on top of this container stack, and determine the second position for the container 504 to be the top surface of this container. If the stack heights of the container stacks in the second area satisfy the stack height threshold, the AGV controller 160 may determine an available position to start a new container stack on the floor surface of the second area, and determine the second position for the container 504 to be this available position on the floor surface. In this example, the AGV controller 160 may determine the second position for the container 504 in the second area to be the top surface of the container 506 as depicted in FIG. 5H. The AGV controller 160 may also determine the location attributes of the second position of the container 504. For example, the AGV controller 160 may determine that the distance between the second position of the container 504 and the floor surface is 100 cm, the distance between the second position of the container 504 and the end point of the storage rack 541 of the storage aisle is 30 cm, etc.

In block 320, the AGV controller 160 may align the container-transport AGV 100 with the second position of the container. To align the container-transport AGV 100 with the second position of the container, the AGV controller 160 may reposition the container-transport AGV 100 relative to the second position of the container such that the container-transport AGV 100 will be facing (e.g., located opposite to) the container when the container is placed at the second position. In some embodiments, the AGV controller 160 may align the container-transport AGV 100 with the second position of the container in the same manner as the AGV controller 160 may align the container-transport AGV 100 with the container when the container is located in the first position. For example, the AGV controller 160 may align the container-transport AGV 100 with the second position of the container based on graphic marker, captured images, etc.

Continuing the example depicted in FIGS. 5A-5M, in stage 540 illustrated in FIG. 5H, the AGV controller 160 may align the container-transport AGV 100 with the top surface of the container 506 to which the container 504 will be released. In this example, the container-transport AGV 100 may be positioned opposite to the container stack that includes the container 506, and thus the container-transport AGV 100 will be opposite to the container 504 when the container 504 is placed on the top surface of the container 506 of the container stack. In this example, when the container-transport AGV 100 is aligned with the container stack, at least a portion of the container stack may be located between the plurality of legs 110 of the container-transport AGV 100 as depicted in FIG. 5H. This implementation is advantageous, because the operations of the container-transport AGV 100 can be facilitated when placing the container 504 on the container 506 of the container stack due to the proximity of the container stack to the container-transport AGV 100.

In block 322, the AGV controller 160 may determine a second surface position for the support surface 140 and a second arm position for the plurality of grabbing arms 120 of the container-transport AGV 100 based on the second position of the container. In some embodiments, the distance between the second surface position of the support surface 140 and the second position of the container may satisfy the first distance threshold (e.g., less than 0.5 cm). Thus, the support surface 140 will be moved to the second surface position that is proximate to the second position to which the container is released, and therefore the movement of the container from the support surface 140 of the container-transport AGV 100 to the second position of the container can be facilitated. In some embodiments, the AGV controller 160 may determine a moving direction and a moving distance for the support surface 140 to move to the second surface position, and determine the second arm position for the plurality of grabbing arms 120 based on the moving direction and the moving distance of the support surface 140. In some embodiments, the moving direction and the moving distance for the plurality of grabbing arms 120 to move to the second arm position may be the same as the moving direction and the moving distance for the support surface 140 to move to the second surface position. As a result, the relative position between the support surface 140 and the plurality of grabbing arms 120 may remain unchanged, and thus the container may continue to be held between the paddles 132 of the plurality of grabbing arms 120 while the container is vertically moved towards the second position by the support surface 140. This implementation is advantageous, because it enables the plurality of grabbing arms 120 to move the container when the support surface 140 reaches the second surface position or move the container simultaneously while the support surface 140 is vertically moving to the second surface position.

In block 324, the AGV controller 160 may actuate the elevator mechanism 104 to vertically move the support surface 140 along the AGV body 102 of the container-transport AGV 100 to the second surface position relative to the second position of the container. The AGV controller 160 may also actuate the elevator mechanisms 106 to vertically move the plurality of grabbing arms 120 along the AGV body 102 of the container-transport AGV 100 to the second arm position relative to the second position of the container. For example, the elevator mechanisms 106 may vertically move the plurality of grabbing arms 120 along the AGV body 102 in the same moving direction with the same moving distance as the support surface 140. Thus, the support surface 140 and the plurality of grabbing arms 120 may vertically move towards the second position to which the container is released.

Figure 5J:
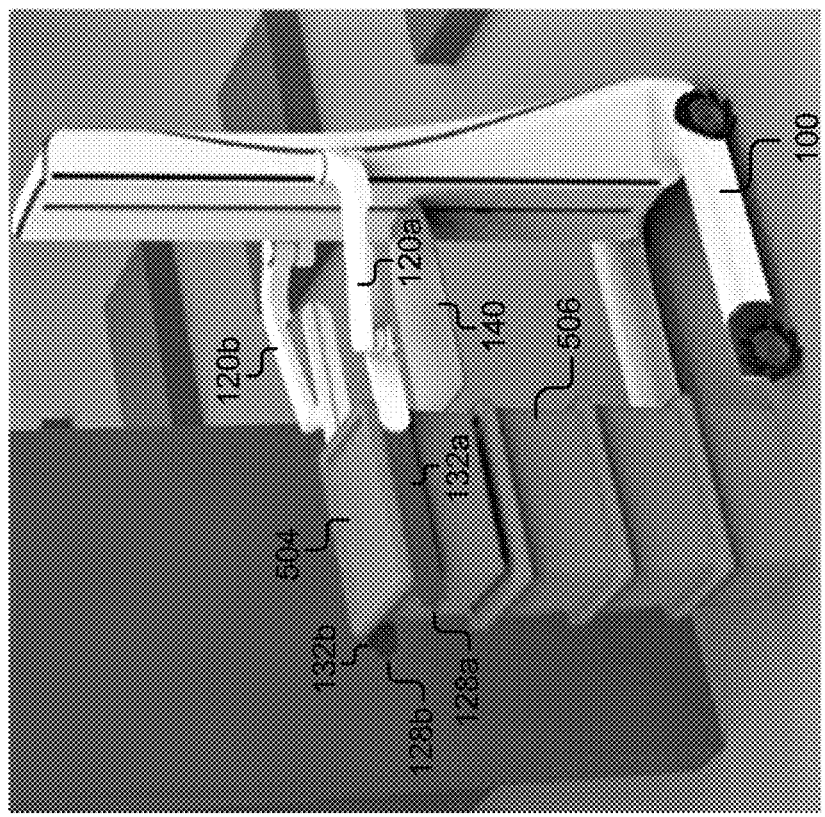
Figure 5I:
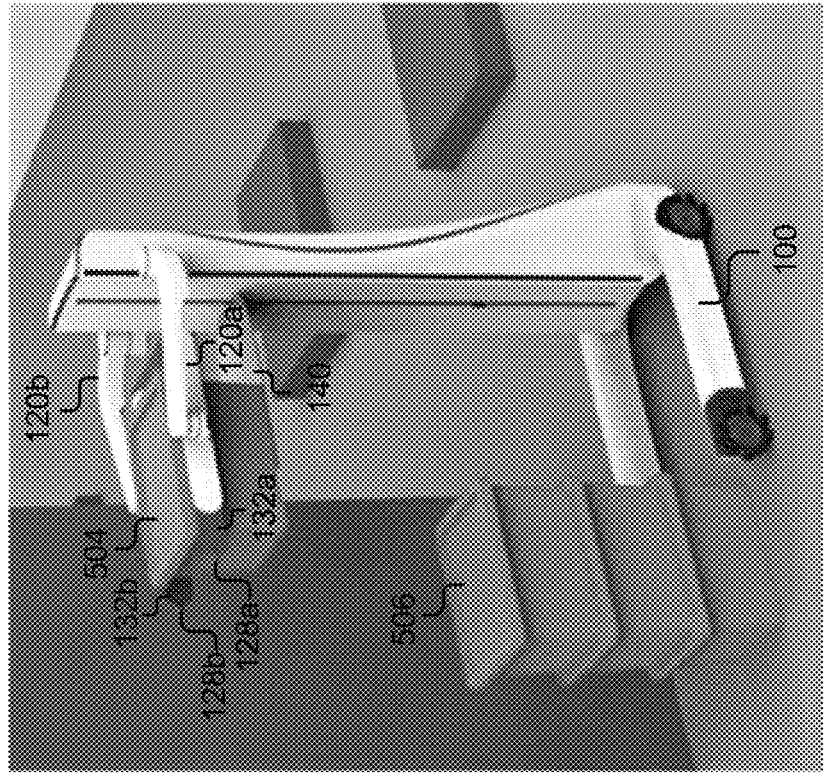

Continuing the example depicted in FIGS. 5A-5M, in stage 550 illustrated in FIG. 5I, the support surface 140 and the plurality of grabbing arms 120 may vertically move downward along the AGV body 102 towards the second position of the container 504 (e.g., the top surface of the container 506). In stage 555 illustrated in FIG. 5J, as the support surface 140 reaches the second surface position and the plurality of grabbing arms 120 reach the second arm position, the support surface 140 may be proximate to the top surface of the container 506 to which the container 504 needs to be released and the plurality of grabbing arms 120 may continue to hold the container 504 between their paddles 132. As a result, the placement of the container 504 on the top surface of the container 506 by the plurality of paddles 132 of the plurality of grabbing arms 120 can be facilitated.

In block 326, the container-transport AGV 100 may move the container situated on the support surface 140 by the plurality of grabbing arms 120 holding the container to place the container at the second position of the container. In some embodiments, to move the container from the support surface 140 to the second position of the container, a grabbing arm 120 in the plurality of grabbing arms 120 may bend the finger element 128 of the grabbing arm 120 away from the second object surface of the container, and slide the paddle 132 forward along the hand element 124 of the grabbing arm 120. As the plurality of grabbing arms 120 slide their paddles 132 forward in parallel along their hand element 124, the plurality of paddles 132 of the plurality of grabbing arms 120 may move the container being held between the plurality of paddles 132 from the support surface 140 towards the second position of the container and place the container at the second position of the container. Thus, the transportation of the container from the first position of the container in the first area to the second position of the container in the second area by the container-transport AGV 100 is completed.

Continuing the example depicted in FIGS. 5A-5M, in stage 550 illustrated in FIG. 5I, the grabbing arm 120a may pivot the finger element 128a away from the back surface 542 of the container 504, and the grabbing arm 120b may pivot the finger element 128b away from the back surface 542 of the container 504. For example, the grabbing arm 120a may pivot the finger element 128a outward relative to the paddle 132a with a pivot angle so that the finger element 128a may return to its default position and no longer rest against the back surface 542. Similarly, the grabbing arm 120b may pivot the finger element 128b outward relative to the paddle 132b with a pivot angle so that the finger element 128b may return to its default position and no longer rest against the back surface 542. Thus, the container 504 may no longer be gripped. This implementation is advantageous, because it can prevent the finger elements 128a and 128b from causing damages to the container 504 as the paddles 132 slide backward after the container 504 is released.

In stage 550 illustrated in FIG. 5I and stage 555 illustrated in FIG. 5J, the grabbing arm 120a may slide the paddle 132a forward along the channel 134 of its hand element 124, and the grabbing arm 120b may slide the paddle 132b forward along the channel 134 of its hand element 124. As depicted in FIGS. 5I and 5J, the grabbing arm 120a and the grabbing arm 120b may slide the paddle 132a and the paddle 132b forward in parallel, thereby moving the container 504 being held between the paddle 132a and the paddle 132b towards the second position of the container 504 (e.g., the top surface of the container 506). In this example, the paddles 132a and 132b may slide forward to move the container 504 towards the top surface of the container 506 while the support surface 140 is vertically moving the container 504 downward along the AGV body 102 towards the top surface of the container 506 as depicted in FIGS. 5I and 5J.

Figure 5L:
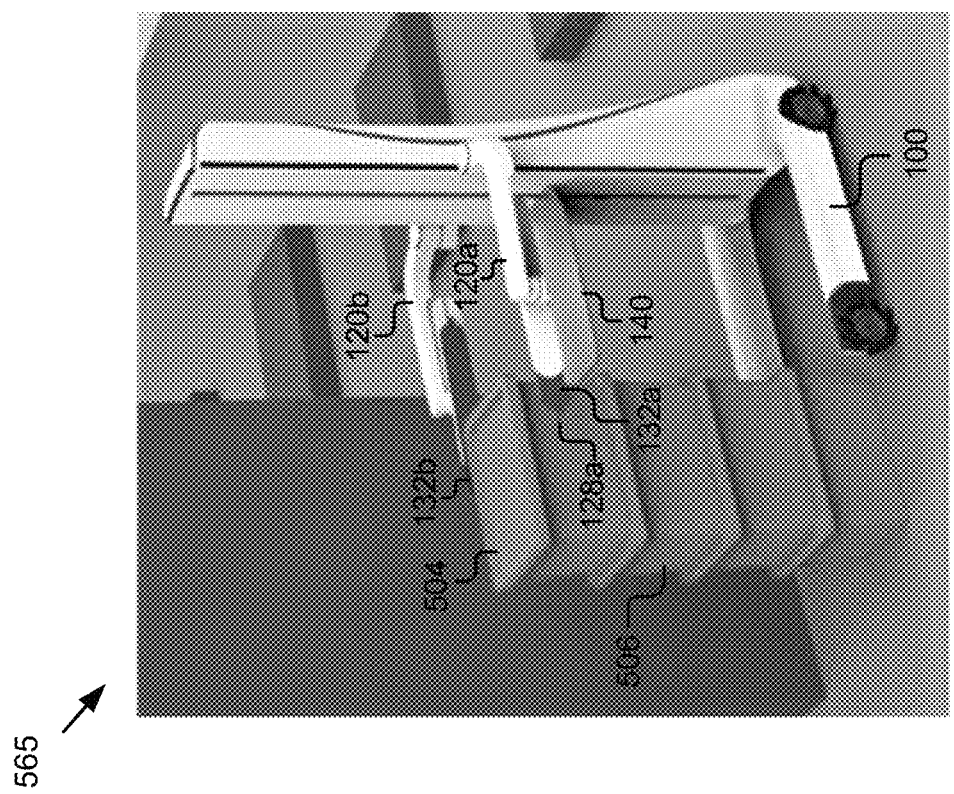
Figure 5K:
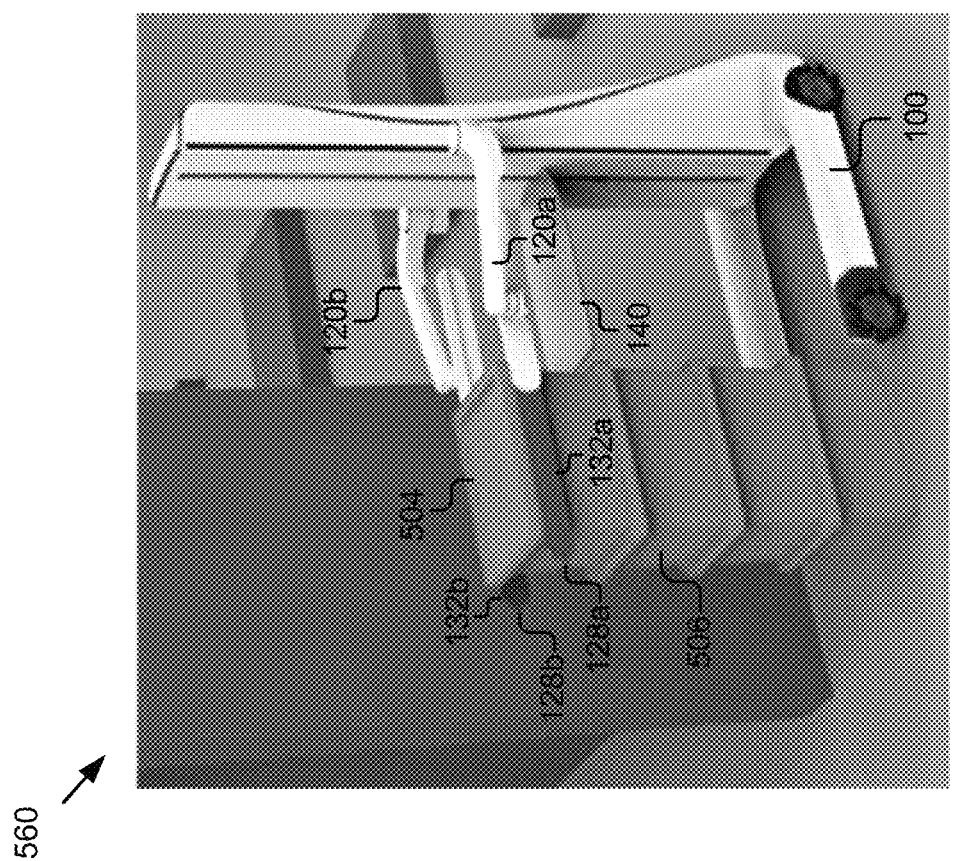
Figure 5M:
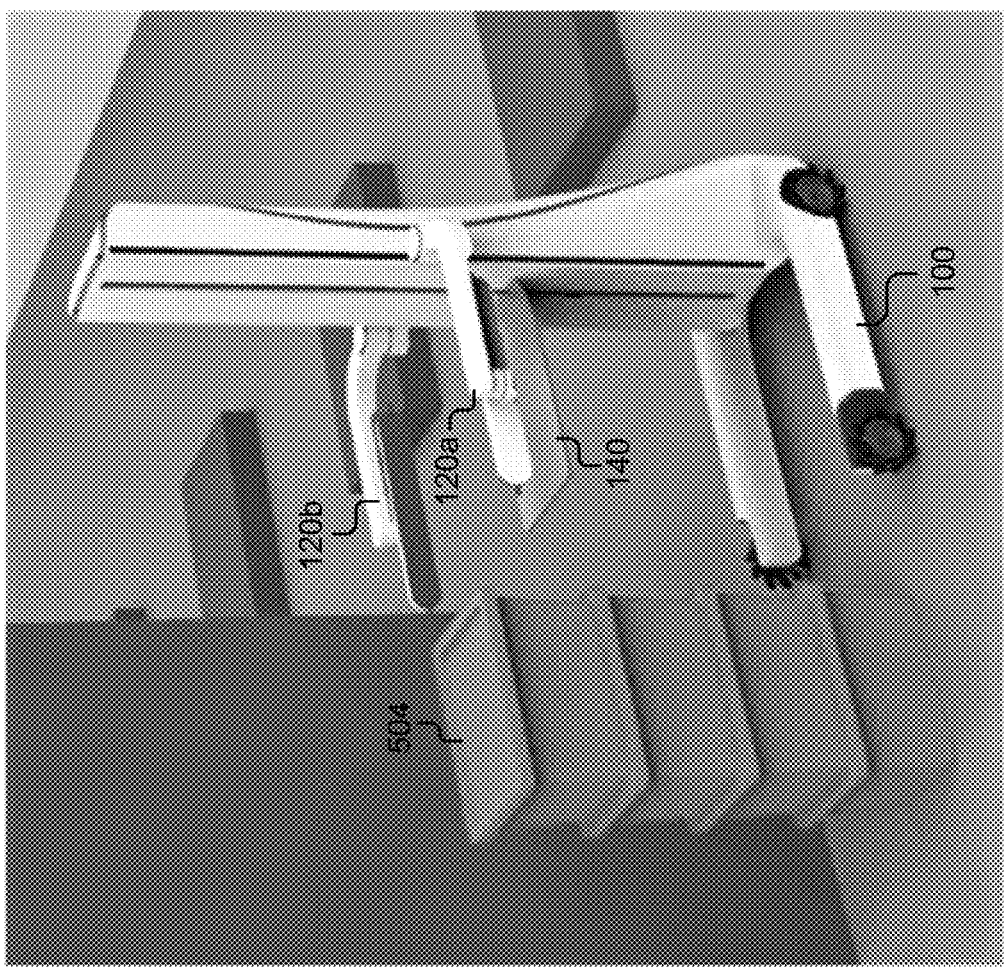

In stage 560 illustrated in FIG. 5K, the paddle 132a of the grabbing arm 120a and the paddle 132b of the grabbing arm 120b may place the container 504 on the top surface of the container 506, thereby releasing the container 504 to its second position. Thus, the transportation of the container 504 from the first position of the container 504 on the top shelf of the shelving unit 502 to the second position of the container 504 on the top surface of the container 506 by the container-transport AGV 100 may be completed. In some embodiments, instead of or in addition to holding the container 504 between the plurality of paddles 132 of the plurality of grabbing arms 120 and sliding the plurality of paddles 132 to move the container 504 being held between these paddles to the second position of the container 504, one or more paddles 132 may perform a sweeping movement to push the container 504 from the support surface 140 to the second position of the container 504. Other implementations for moving the container 504 to the second position of the container 504 are also possible and contemplated.

In stage 565 illustrated in FIG. 5L, once the container 504 is placed at the second position on the top surface of the container 506, the plurality of grabbing arms 120 may return the components of the plurality of grabbing arms 120 to their default positions. As depicted in FIG. 5L, the grabbing arms 120a and 120b may slide the paddles 132a and 132b backward along the channel 134 of their hand element 124 to retract these paddles 132 to their default positions relative to the hand elements 124. As discussed above, in stage 550 illustrated in FIG. 5I, the plurality of grabbing arms 120 may pivot the finger elements 128a and 128b to return these finger elements 128 to their default positions relative to the paddles 132. The plurality of grabbing arms 120 may also horizontally pivot at their shoulder element 122 and/or wrist element 126 to adjust the distance between the plurality of paddles 132 to a default distance, and thus the plurality of paddles 132 of the plurality of grabbing arms 120 may no longer rest against the object surfaces of the container 504 as depicted in FIG. 5L. In addition, the plurality of grabbing arms 120 and/or the support surface 140 may vertically move along the AGV body 102 to their default positions on the AGV body 102. In this example, in stage 570 illustrated in FIG. 5M, the components of the plurality of grabbing arms 120 may be at the default positions of these components, and the plurality of grabbing arms 120 and the support surface 140 may vertically remain at the second arm position and the second surface position relative to the second position to which the container 504 was released. In this stage, the container-transport AGV 100 may be ready to perform a subsequent task.

Figure 4A:
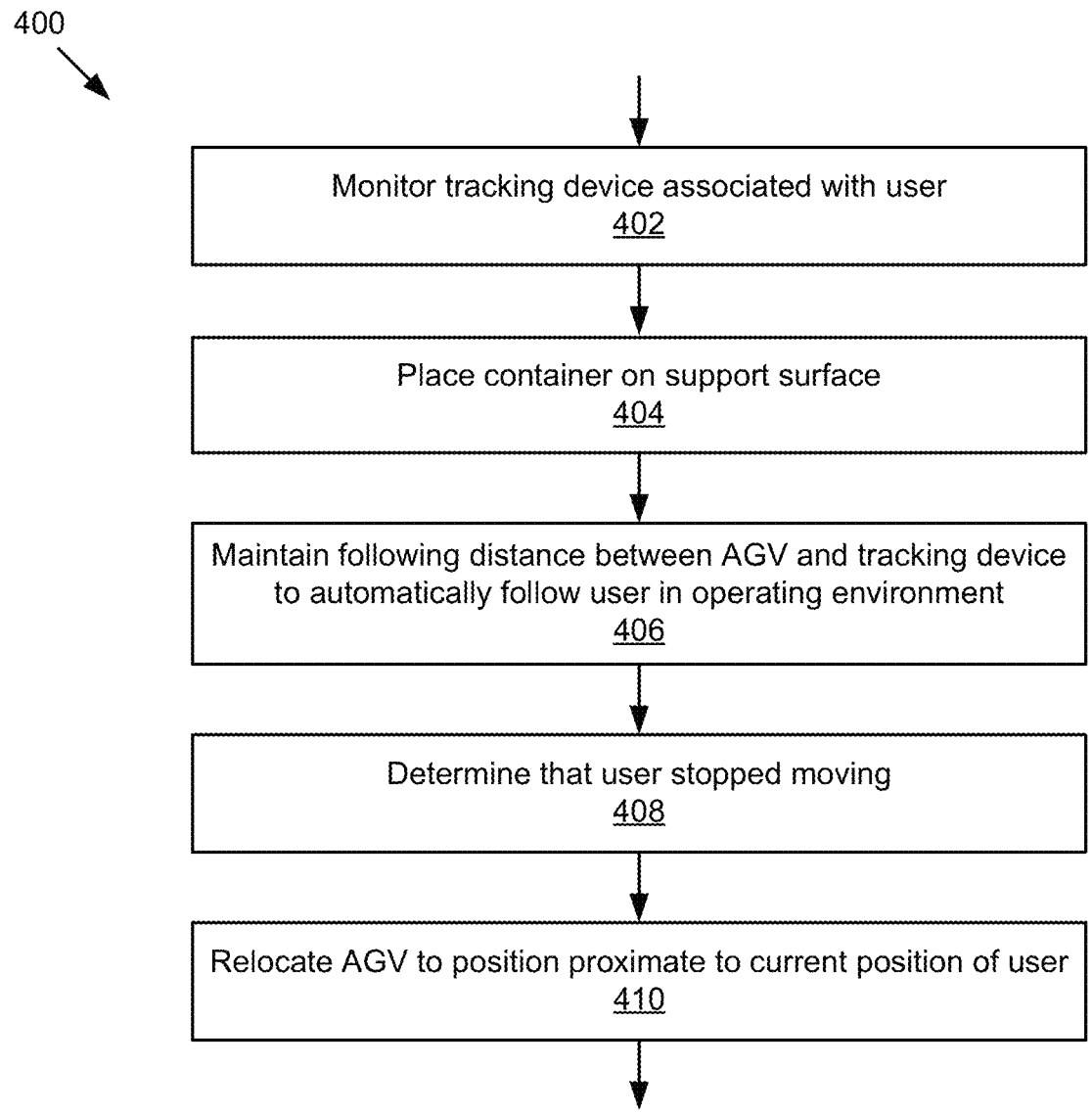
FIG. 4A illustrates a flowchart of an example method for a container-transport AGV to automatically follow a user in an operating environment.

FIG. 4A illustrates an example method 400 for the container-transport AGV 100 to carry an object and automatically follow a user in the operating environment. The method 400 is described below in the context of a storage facility in which the object may be a container storing inventory items and the container-transport AGV 100 may carry the container on its support surface 140 and automatically follow a user (e.g., a human worker) in the storage facility, thereby facilitating the user in putting away the items in the containers to their storage locations. In some embodiments, the method 400 may be performed by the container-transport AGV 100 as the container-transport AGV 100 is controlled by the AGV controller 160.

In block 402, the AGV controller 160 may monitor a tracking device associated with the user. In some embodiments, the tracking device may be held, worn, clipped to, or otherwise attached to the human worker, and thus the position of the tracking device may indicate a current position of the user in the storage facility. In some embodiments, the tracking device may periodically transmit the current position of the user to the server 250 and/or to other entities located proximate to the user. For example, the tracking device may broadcast the current position of the user to the AGVs located within a predefined distance from the tracking device (e.g., 250 m) at a predefined interval (e.g., every 0.5 s). Non-limiting examples of the tracking device include, but are not limited to, beacon, Bluetooth™ device, wearable device (e.g., smart watch, smart glasses), smart phone, etc.

In block 404, the container-transport AGV 100 may place a container on its support surface 140. In some embodiments, to place the container on the support surface 140, the container-transport AGV 100 may perform the operations described above with reference to blocks 302-314 in FIG. 3A. As an example, one or more containers may contain inventory items stored in a storage aisle and may be transported to a designated area of the storage aisle by the container-transport AGV 100 as discussed elsewhere herein. The container-transport AGV 100 may then retrieve a container from the one or more containers in the designated area of the storage aisle, and place the container on the support surface 140 of the container-transport AGV 100.

In block 406, responsive to placing the container on the support surface 140 of the container-transport AGV 100, the container-transport AGV 100 may maintain a following distance between the container-transport AGV 100 and the tracking device to automatically follow the user in the storage facility. In some embodiments, the AGV controller 160 may receive the current position of the user from the tracking device, and automatically relocate the container-transport AGV 100 to maintain the following distance to the tracking device (e.g., 0.5 m). As a result, the container-transport AGV 100 may automatically follow the user with the container situated on its support surface 140 as the user proceeds in the storage facility. This implementation is advantageous, because it eliminates the need for the user to manually carry the container or push a cart including the container while walking back and forth along the storage aisle to put away the items stored in the container.

In block 408, the AGV controller 160 may determine whether the user stopped moving in the storage facility. In some embodiments, the AGV controller 160 may determine a difference between the current position of the user during a predefined time period (e.g., in the last 5 s). The AGV controller 160 may determine that the difference between the current position of the user during the time period satisfy a moving distance threshold (e.g., less than 5 cm), and thus determine that the user stopped moving.

In block 410, responsive to determining that the user stopped moving, the AGV controller 160 may relocate the container-transport AGV 100 to a position proximate to the current position of the user. In some embodiments, the AGV controller 160 may relocate the container-transport AGV 100 towards the current position of the user such that the distance between the container-transport AGV 100 and the current position of the user satisfies a reaching distance threshold (e.g., less than 15 cm), which may be advantageous because these operations may facilitate the user in reaching the items stored in the container when the user stops at the storage locations of the items. Thus, by automatically following the user with the container situated on the support surface 140 and relocating to the position proximate to the current position of the user when the user stopped moving, the container-transport AGV 100 can provide a hands-free experience to the user and facilitate the user in distributing inventory items stored in the container at their storage locations.

Figure 4B:
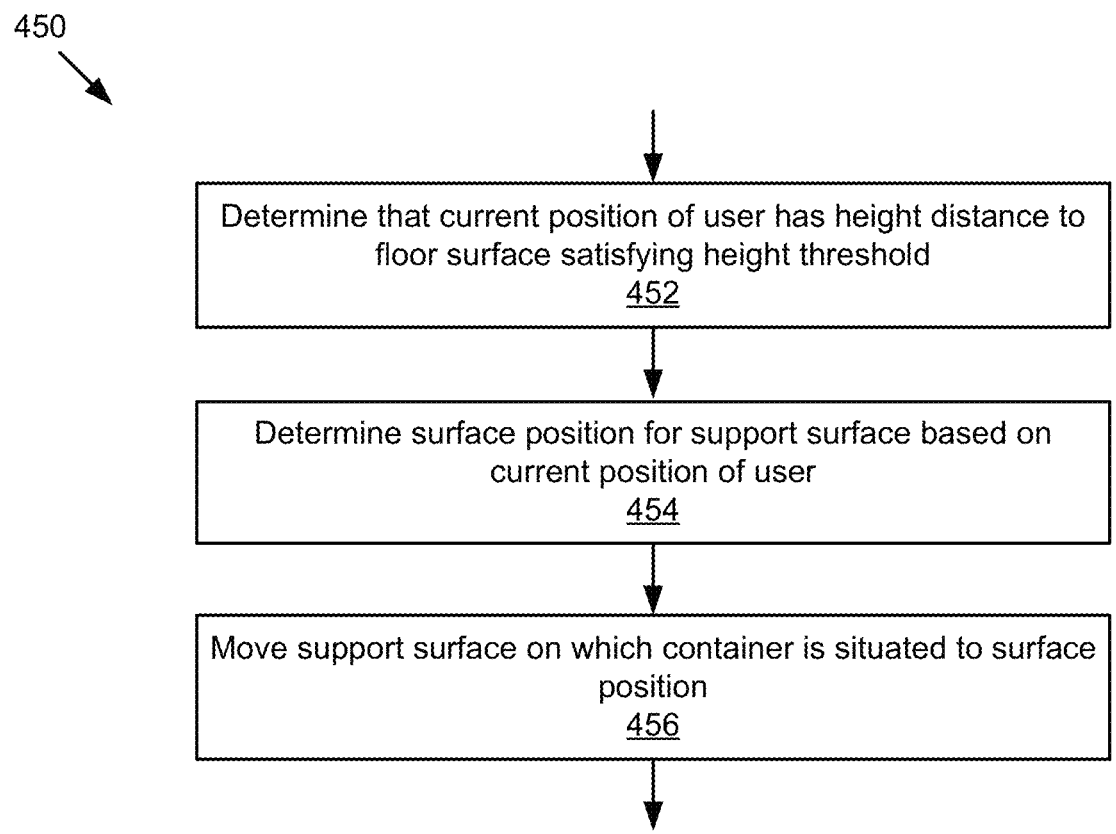
FIG. 4B illustrates a flowchart of an example method for a container-transport AGV to vertically move an object based on a current position of the user.

FIG. 4B illustrates an example method 450 for the container-transport AGV 100 to vertically move an object based on the current position of the user. The method 400 is described below in the context of a storage facility in which the object may be a container storing items and the container-transport AGV 100 may vertically move the container situated on its support surface 140 upward or downward based on the current position of the user. In some embodiments, the method 400 may be performed by the container-transport AGV 100 as the container-transport AGV 100 is controlled by the AGV controller 160.

In block 452, the AGV controller 160 may receive the current position of the user from the tracking device. The AGV controller 160 may determine that the current position of the user has a height distance to the floor surface satisfying a height threshold (e.g., more than 120 cm or less than 30 cm), and thus determine that the user moved from a regular position at which the user stands on the floor surface to a higher position or to a lower position in order to reach the storage location of the items stored in the container. For example, the user may step on a ladder or sit down on the floor surface. In some embodiments, the AGV controller 160 may then relocate the container-transport AGV 100 towards the current position of the user. As discussed elsewhere herein, the AGV controller 160 may relocate the container-transport AGV 100 to the position that has the distance between the container-transport AGV 100 and the current position of the user satisfying the reaching distance threshold (e.g., less than 15 cm).

In block 454, responsive to determining that the user moved to the higher position or the lower position as compared to the regular position of the user, the AGV controller 160 may determine a surface position for the support surface 140 on which the container is situated. In some embodiments, the AGV controller 160 may determine the surface position for the support surface 140 along the AGV body 102 that has a vertical distance between the surface position of the support surface 140 and the current position of the user satisfying a distance threshold (e.g., less than 5 cm).

In block 456, the AGV controller 160 may move the support surface 140 on which the container is situated to the surface position. In some embodiments, the AGV controller 160 may actuate the elevator mechanism 104 to vertically move the support surface 140 along the AGV body 102 of the container-transport AGV 100 to the surface position vertically proximate to the current position of the user. In some embodiments, the AGV controller 160 may also move the plurality of grabbing arms 120 in parallel with the support surface 140. For example, the AGV controller 160 may actuate the elevator mechanisms 106 to vertically move the support surface 140 in the same moving direction with the same moving distance as the support surface 140, and thus the container may continue to be held between the plurality of grabbing arms 120 and supported from underneath by the support surface 140 as the support surface 140 reaches the surface position. As the support surface 140 reaches the surface position, the container situated on the support surface 140 may be vertically proximate to the current position of the user, thereby facilitating the user in reaching the items stored in the container, which may be advantageous because it may eliminate or reduce the need for the user to manually carry the object while moving to the higher position or to the lower position, thereby providing a hands-free experience that improves the safety of the user when performing these movements.

It should be understood that the container-transport AGV 100 can advantageously transport various objects between various locations in any operating environment. For example, the container-transport AGV 100 may perform the method 300 described above with reference to FIGS. 3A and 3B to automatically transport a container from a first storage slot of a first storage aisle to a second storage slot of a second storage aisle, unload one or more containers from a shelving unit to a floor surface, transport a container placed on the floor surface to a storage slot of a storage aisle at which an item type in the container are stored, etc. As discussed elsewhere herein, the container-transport AGV 100 can also carry a container on its support surface 140 and automatically follow a user as the user walks around in the operating environment, vertically move the support surface 140 to raise or lower the container situated on its support surface 140 to different height based on the current position of the user, etc. Other example scenarios are also possible and contemplated.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input and/or output devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. An automated guided vehicle (AGV) comprising:
    an AGV body;
    one or more elevator mechanisms coupled to the AGV body;
    a support surface coupled to the AGV body and vertically movable along the AGV body by the one or more elevator mechanisms, the support surface supporting an object from underneath the object when the object is placed on the support surface;
    one or more arms coupled to the AGV body and vertically movable along the AGV body by the one or more elevator mechanisms, the one or more arms articulating to move the object from a first position of the object and place the object on the support surface, the one or more arms including a grasping member positioned at an end of the one or more arms distal from the AGV body, the grasping member including:
        a grasping member body;
        a paddle on a first side of the grasping member and coupled with the grasping member body using a sliding mechanism that slides the paddle horizontally relative to the grasping member body; and
        a wrist element on a second side of the grasping member and pivoting the grasping member body relative to the one or more arms, the second side of the grasping member opposing the first side of the grasping member, the wrist element and the sliding mechanism allowing the paddle to slide at variable angles relative to the one or more arms;
    and
    an AGV controller configured to control one or more operations of the AGV.

2. The AGV of claim 1, wherein the one or more arms includes a plurality of arms and an arm in the plurality of arms includes:
    a hand element comprising the paddle slideable along the hand element, the paddle adapted to hold the object between a plurality of paddles of the plurality of arms, the paddle sliding along the hand element when the object is held between the plurality of paddles of the plurality of arms to move the object.

3. The AGV of claim 2, wherein the hand element includes:
a finger element mounted to an end of the paddle, the finger element being horizontally pivotable to rest against a second object surface of the object to grasp the object.

4. The AGV of claim 1, wherein the one or more arms includes a plurality of arms and an arm in the plurality of arms includes:
a shoulder element coupling the arm to the AGV body, the shoulder element adapted to horizontally pivot the arm around the shoulder element to adjust a distance between a plurality of paddles of the plurality of arms based on the object; and
the wrist element coupling a hand element of the arm to the arm, the wrist element adapted to horizontally pivot the hand element around the wrist element to adjust the distance between the plurality of paddles of the plurality of arms based on the object.

5. The AGV of claim 1, wherein:
the AGV transports the object to or from a shelving unit; and
the AGV includes one or more legs coupled to the AGV body, the one or more legs satisfying a height threshold associated with a space underneath the shelving unit.

6. The AGV of claim 1, further comprising:
a plurality of legs coupled to the AGV body and separated by a distance satisfying a distance threshold to accommodate the object between the plurality of legs.

7. The AGV of claim 1, further comprising:
a user communication unit including a voice interface device, the voice interface device adapted to receive one or more of a voice command and a voice input from a user.

8. The AGV of claim 1, wherein the AGV controller executes one or more instructions that cause the AGV to:
align the AGV with the first position of the object;
vertically move the support surface along the AGV body to a first surface position relative to the first position of the object;
vertically move the one or more arms along the AGV body to a first arm position relative to the first position of the object;
retrieve the object from the first position of the object using the one or more arms, the one or more arms holding the object; and
move the object towards the support surface by the one or more arms holding the object to place the object on the support surface.

9. A method comprising:
determining a first position of an object in a first area;
aligning an automated guided vehicle (AGV) with the first position of the object, the AGV including a support surface, one or more arms coupled to an AGV body, and two or more legs coupled with the AGV body and providing support to the AGV body, the support surface and the one or more arms being vertically movable along the AGV body, the one or more arms including a grasping member positioned at an end of the one or more arms distal from the AGV body, the grasping member including:
a grasping member body;
a paddle on a first side of the grasping member and coupled with the grasping member body using a sliding mechanism that slides the paddle horizontally relative to the grasping member body; and
a wrist element coupled to a second side of the grasping member and pivoting the grasping member body relative to the one or more arms, the second side of the grasping member opposing the first side of the grasping member, the wrist element and the sliding mechanism allowing the paddle to slide at variable angles relative to the one or more arms;
vertically moving the support surface of the AGV along the AGV body to a first surface position relative to the first position of the object;
vertically moving the one or more arms of the AGV along the AGV body to a first arm position relative to the first position of the object;
retrieving the object from the first position of the object using the one or more arms, the one or more arms holding the object; and
moving the object towards the support surface by the one or more arms holding the object to place the object on the support surface.

10. The method of claim 9, further comprising:
determining an object size of the object;
adjusting the one or more arms based on the object size of the object; and
responsive to moving the support surface to the first surface position and the one or more arms to the first arm position and responsive to adjusting the one or more arms, retrieving the object from the first position of the object using the one or more arms.

11. The method of claim 9, wherein an arm in the one or more arms includes:
a shoulder element coupling the arm to the AGV body, the arm being horizontally pivotable around the shoulder element;
a hand element including the paddle slideable along the hand element and a finger element mounted to an end of the paddle, the finger element being pivotable to rest against an object surface of the object; and
the wrist element coupling the hand element to the arm, the hand element being horizontally pivotable around the wrist element.

12. The method of claim 11, wherein the one or more arms include a plurality of arms, and the method comprises:
determining an object size of the object; and
horizontally pivoting one or more of the arm and the hand element of the arm to adjust a distance between a plurality of paddles of the plurality of arms based on the object size of the object.

13. The method of claim 11, wherein:
the one or more arms include a plurality of arms; and
retrieving the object from the first position of the object and moving the object towards the support surface includes:
sliding the paddle forward to hold the object between a plurality of paddles of the plurality of arms;
pivoting the finger element to rest the finger element against a second object surface of the object to grasp the object; and
sliding the paddle backward along the hand element to move the object being held by the plurality of paddles of the plurality of arms towards the support surface and place the object on the support surface.

14. The method of claim 9, further comprising:
determining the first surface position for the support surface based on the first position of the object, a distance between the first surface position of the support surface and a bottom surface of the object located at the first position satisfying a first distance threshold; and determining the first arm position for the one or more arms based on the first position of the object, a distance between the first arm position of the one or more arms and a top surface of the object located at the first position satisfying a second distance threshold.

15. The method of claim 9, further comprising:
responsive to placing the object on the support surface of the AGV, transporting the object situated on the support surface to a second area;

determining a second position for the object in the second area;

aligning the AGV with the second position of the object;

vertically moving the support surface of the AGV along the AGV body to a second surface position relative to the second position of the object;

vertically moving the one or more arms of the AGV along the AGV body to a second arm position relative to the second position of the object; and moving the object situated on the support surface of the AGV by the one or more arms holding the object to place the object at the second position of the object.

16. The method of claim 15, further comprising:
determining the second surface position for the support surface based on the second position of the object, a distance between the second surface position of the support surface and the second position of the object satisfying a first distance threshold;

determining a moving direction and a moving distance for the support surface to move to the second surface position; and determining the second arm position for the one or more arms based on the moving direction and the moving distance of the support surface.

17. The method of claim 15, wherein:
the one or more arms include a plurality of arms; and
moving the object to the second position of the object includes:
  pivoting a finger element of an arm away from an object surface of the object against which the finger element rested; and
  sliding a paddle forward along a hand element of the arm to move the object being held by the plurality of arms from the support surface of the AGV to the second position of the object.

18. The method of claim 9, further comprising:
monitoring a tracking device associated with a user, the tracking device indicating a current position of the user in an operating environment;

placing a first object on the support surface of the AGV; and responsive to placing the first object on the support surface of the AGV, maintaining a following distance between the AGV and the tracking device to automatically follow the user in the operating environment.

19. The method of claim 18, further comprising:
responsive to determining that a height distance of the current position of the user to a floor surface satisfies a height threshold, determining a surface position for the support surface based on the current position of the user; and vertically moving the support surface of the AGV on which the object is situated along the AGV body to the surface position.

20. An automated guided vehicle (AGV) comprising:
an AGV body;
one or more elevator mechanisms coupled to the AGV body;
a support surface coupled to the AGV body and vertically movable along the AGV body by the one or more elevator mechanisms, the support surface supporting an object from underneath the object when the object is placed on the support surface;
a plurality of arms coupled to the AGV body and vertically movable along the AGV body by the one or more elevator mechanisms, the plurality of arms articulating to move the object from a first position of the object and place the object on the support surface, an arm in the plurality of arms including:
  a hand element positioned at an end of the arm distal from the AGV body and comprising a paddle slideable along the hand element using a sliding mechanism and a finger element mounted to an end of the paddle, the paddle adapted to hold the object between a plurality of paddles of the plurality of arms, the finger element adapted to pivot to rest against a second object surface of the object to grasp the object, the paddle being located on a first side of the hand element,
  a wrist element positioned at a second side of the hand element and coupling the hand element to the arm, the wrist element adapted to horizontally pivot the hand element around the wrist element the wrist element and the sliding mechanism allowing the paddle to slide at variable angles relative to the arm, the second side of the hand element opposing the first side of the hand element, and
  a shoulder element coupling the arm to the AGV body, the shoulder element adapted to horizontally pivot the arm around the shoulder element to adjust a distance between the plurality of paddles of the plurality of arms based on the object;
two or more legs coupled to the AGV body and providing support to the AGV body, the two or more legs including one or more multi-directional wheels at a position on the two or more legs distal from the AGV body, the two or more legs including a first leg and a second leg, the first leg being separated from the second leg to form an opening that allows at least a portion of the support surface to move vertically into the opening between the two or more legs; and
an AGV controller configured to control one or more operations of the AGV.

* * * * *